United States Patent [19]
Stump et al.

[11] Patent Number: 5,720,354
[45] Date of Patent: Feb. 24, 1998

[54] TRENCHLESS UNDERGROUND BORING SYSTEM WITH BORING TOOL LOCATION

[75] Inventors: Gregory S. Stump, Oakland, Ill.; Christopher T. Allen, Independence, Md.

[73] Assignee: Vermeer Manufacturing Company, Pella, Iowa

[21] Appl. No.: 587,832

[22] Filed: Jan. 11, 1996

[51] Int. Cl.$^6$ .............................. E21B 47/00; G01V 1/00
[52] U.S. Cl. .................... 175/26; 175/45; 340/893.5
[58] Field of Search ................. 175/26, 45; 340/853.5, 340/853.6

[56] References Cited

U.S. PATENT DOCUMENTS

| | | |
|---|---|---|
| 3,718,930 | 2/1973 | McCullough et al. . |
| 3,781,879 | 12/1973 | Staras et al. . |
| 3,831,173 | 8/1974 | Lerner . |
| 3,975,735 | 8/1976 | McCullough et al. . |
| 4,297,699 | 10/1981 | Fowler et al. . |
| 4,646,277 | 2/1987 | Bridges et al. ............. 175/26 X |
| 4,698,634 | 10/1987 | Alongi et al. . |
| 4,710,708 | 12/1987 | Rorden et al. . |
| 4,728,897 | 3/1988 | Gunton . |
| 4,787,463 | 11/1988 | Geller et al. . |
| 4,806,869 | 2/1989 | Chau et al. . |
| 4,814,768 | 3/1989 | Chang . |
| 4,843,597 | 6/1989 | Gjessing et al. . |
| 4,875,014 | 10/1989 | Roberts et al. ............. 175/26 X |
| 4,881,083 | 11/1989 | Chau et al. . |
| 4,905,008 | 2/1990 | Kawano et al. . |
| 4,907,658 | 3/1990 | Stangl et al. . |
| 4,912,643 | 3/1990 | Beirne . |
| 4,953,638 | 9/1990 | Dunn . |
| 5,012,248 | 4/1991 | Munro et al. . |
| 5,065,098 | 11/1991 | Salsman et al. . |
| 5,070,462 | 12/1991 | Chau . |
| 5,092,657 | 3/1992 | Bryan, Jr. . |
| 5,155,442 | 10/1992 | Mercer . |

(List continued on next page.)

FOREIGN PATENT DOCUMENTS

90/15343  12/1990  WIPO .

OTHER PUBLICATIONS

Chemrad Tennessee Corporation, USRADS Series 2100, Brochure undated.
Fenning, et al., Geophysical Methods for the Location of Underground Storage Tanks, Article undated.
Geophysical Survey Systems, Inc., Radan™—Radar Data Analyzer, Production Information Sheet, Jan., 1993.

(List continued on next page.)

*Primary Examiner*—William P. Neuder
*Attorney, Agent, or Firm*—Merchant, Gould, Smith, Edell, Welter & Schmidt, P.A.

[57] ABSTRACT

An apparatus and method for locating an underground boring tool using a radar-like probe and detection technique. A boring tool is provided with a device which generates a specific signature signal in response to a probe signal transmitted from above the ground. Cooperative operation between the probe signal transmitter at ground level and a signature signal generator disposed within the boring tool provides for the accurate locating of the boring tool, despite the presence of a large background signal. The signature signal produced by the boring tool may be generated either passively or actively, and in a manner which differs from the probe signal in one or more ways, including timing, frequency content, or polarization. A survey of a boring site, made either prior to or during the boring operation, provides data related to the characteristics of the ground medium subjected to the survey and the identification of underground hazards, such as buried utilities. Knowledge of ground characteristics enables estimates of boring productivity and cost to be made. Accurate surveys of planned boring pathways can be made and compared, either contemporaneously or subsequently, against the accurately measured position of the boring tool during a boring operation. The direction of the boring tool may be adjusted in response to the measured position in order to maintain the boring tool along the planned pathway and at an optimum boring rate.

44 Claims, 19 Drawing Sheets

U.S. PATENT DOCUMENTS

| | | |
|---|---|---|
| 5,264,795 | 11/1993 | Rider . |
| 5,325,095 | 6/1994 | Vadnais et al. . |
| 5,337,002 | 8/1994 | Mercer . |
| 5,339,080 | 8/1994 | Steinway et al. . |
| 5,355,965 | 10/1994 | Rozendaal . |
| 5,384,715 | 1/1995 | Lytton . |
| 5,469,155 | 11/1995 | Archambeault et al. ............. 175/45 X |
| 5,499,029 | 3/1996 | Bashforth et al. . |
| 5,585,726 | 12/1996 | Chan .................................... 175/45 X |

OTHER PUBLICATIONS

Geophysical Survey Systems, Inc., Subsurface Solutions, Winter 1995.

Geophysical Survey Systems, Inc., Sir© System–2 Subsurface Interface Radar, Brochure undated.

Geophysical Survey Systems, Inc., Sir© System–10A Subsurface Interface Radar, Brochure undated.

Geophysical Survey Systems, Inc., Sir© System Antennas, Brochure undated.

Geophysical Survey Systems, Inc., Model 3200MLF, Multiple, Low–Frequency, Bistatic Antenna, Brochure undated.

Geophysical Survey Systems, Inc., Subsurface Detection Problems, Brochure undated.

GeoRadar, Inc., Model 1000B, Stepped–FM Ground Penetrating Radar, Brochure undated.

Pollution Engineering, Peering Beneath the Surface, Article, Oct., 1992.

Sensors & Software, Inc., Pulse EKKO™ 100, Features, Brochure undated.

Sensors & Software, Inc., Pulse EKKO™ 100, Ground Penetrating Radar Technology, Brochure undated.

Sensors & Software, Inc., Pulse EKKO™ 100 Case Studies, pp. 80–83, 87–94, 98, 100, 129, 131 undated.

Sensors & Software, Inc., Pulse EKKO™ 1000, Brochure undated.

Sensors & Software, Inc., Pulse EKKO™, Environment, Feb. 1994.

Weil et al., Investigations of Hazardous Waste Sites Using Thermal IR and Ground Penetrating Radar, Photogrammetric Engineering & Remote Sensing, vol. 60, No. 8, Aug. 1994, pp. 999–1005.

Kathage, A.F., Proceedings of the Fourth International Conference on Ground Penetrating Radar, Geological Survey of Finland, A Challenge: GPR in Advance of Horizontal Drilling, Special Paper 16, Jun., 1992, pp. 119–124.

Guenther, M. and Kathage, A.F., Proceedings of the Fifth Internations Conference on Ground Penetrating Radar, The Geophysical Investigation of Drilling Obstacles for Microtunnelling Projects by Means of GPR, vol. 3 of 3, Jun., 1994, pp. 1151–1165.

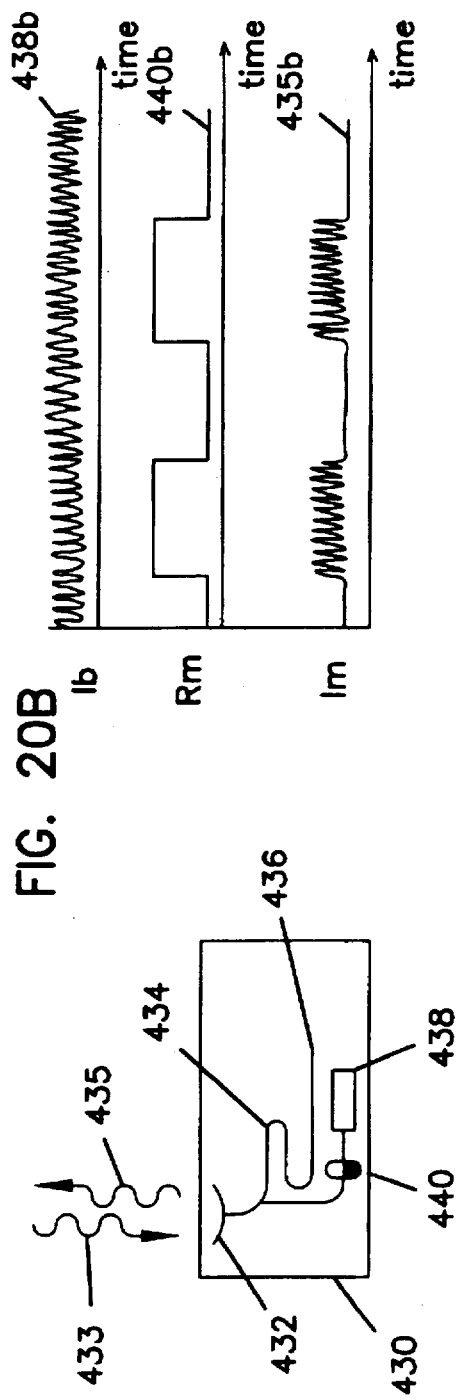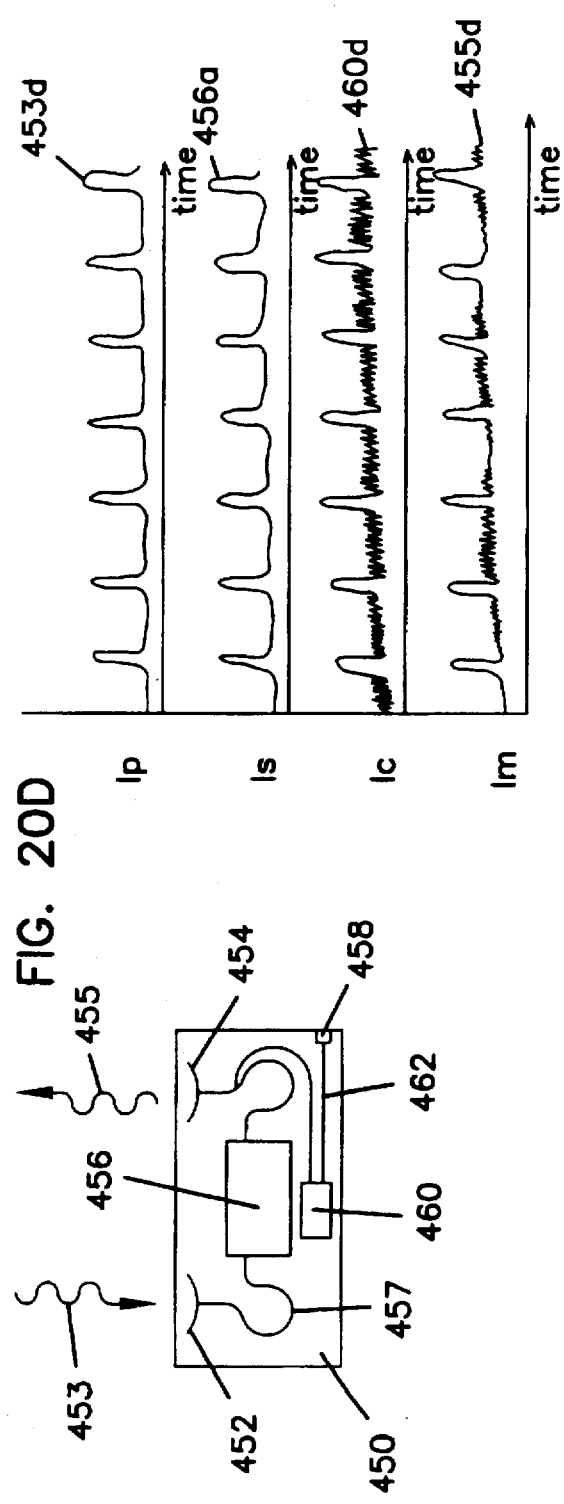

TRENCHLESS UNDERGROUND BORING SYSTEM WITH BORING TOOL LOCATION

FIELD OF THE INVENTION

The present invention relates generally to the field of trenchless underground boring and, more particularly, to a system and process for acquiring positional data on an underground boring tool, for controlling the underground boring tool in response to the positional data, and for characterizing the ground medium through which the tool is boring.

BACKGROUND OF THE INVENTION

Utility lines for water, electricity, gas, telephone and cable television are often run underground for reasons of safety and aesthetics. In many situations, the underground utilities can be buried in a trench which is then back-filled. Although useful in areas of new construction, the burial of utilities in a trench has certain disadvantages. In areas supporting existing construction, a trench can cause serious disturbance to structures or roadways. Further, there is a high probability that digging a trench may damage previously buried utilities, and that structures or roadways disturbed by digging the trench are rarely restored to their original condition. Also, the trench poses a danger of injury to workers and passersby.

The general technique of boring a horizontal underground hole has recently been developed in order to overcome the disadvantages described above, as well as others unaddressed when employing conventional trenching techniques. In accordance with such a general horizontal boring technique, also known as microtunnelling or trenchless underground boring, a boring system sits on the ground surface and drills a hole into the ground at an oblique angle with respect to the ground surface. Water is flowed through the drill string, over the boring tool, and back up the borehole in order to remove cuttings and dirt. After the boring tool reaches the desired depth, the tool is then directed along a substantially horizontal path to create a horizontal borehole. After the desired length of borehole has been obtained, the tool is then directed upwards to break through to the surface. A reamer is then attached to the drill string which is pulled back through the borehole, thus reaming out the borehole to a larger diameter. It is common to attach a utility line or conduit to the reaming tool so that it is dragged through the borehole along with the reamer.

This general method of drilling a trenchless borehole has been described by Geller et al. (U.S. Pat. No. 4,787,463) and Dunn (U.S. Pat. No. 4,953,638). Methods of directing an underground boring tool are disclosed in these patents. In order to provide for the location of the boring tool while underground, Geller discloses the incorporation of an active beacon, in the form of a radio transmitter, disposed within the boring tool. A receiver placed on the surface is used to determine the position of the tool through radio direction finding. However, since there is no synchronization between the beacon and the detector, the depth of the tool cannot be measured directly, and the position measurement of the boring tool is restricted to the two dimensional surface plane. The depth of the boring tool, however, can be determined indirectly by measuring the water pressure at the boring tool, a process which requires halting the boring operation. Moreover, the radio direction finding techniques described in the prior art have limited accuracy in determining the position of the boring tool. These limitations can have severe consequences when boring a trenchless underground hole in an area which contains several existing underground utilities or other natural or man-made hazards, in which case the location of the boring tool must be precisely determined in order to avoid accidentally disturbing or damaging the utilities.

The use of ground penetrating radar (GPR) for performing surveys along proposed trenchless boring routes has been examined by Kathage (Proceedings of the Fourth International Conference on Ground Penetrating Radar, Geological Survey of Finland, Special Paper 16, "A Challenge: GPR In Advance Of Horizontal Drilling," pp. 119–124, June, 1992) and Geunther et al. (Proceedings of the Fifth International Conference on Ground Penetrating Radar, Vol. 3 of 3, "The Geophysical Investigation Of Drilling Obstacles For Microtunnelling Projects By Means of GPR," pp. 1151–1165, June, 1994), who noted several advantages of using GPR to determine certain geological characteristics of the ground being surveyed and of storing survey results in a database. The GPR image information obtained during the survey, however, is described in these publications as being used only to a limited extent, such as being added to a survey database or being used when performing some limited operations on the survey database.

Ground-penetrating-radar is a sensitive technique for detecting even small changes in the subsurface dielectric constant. Consequently, the images generated by GPR systems contain a great amount of detail, much of it either unwanted or unnecessary for the task at hand. A major difficulty, therefore, in using GPR for locating a boring tool concerns the present inability in the art to correctly distinguish the boring tool signal from all of the signals generated by the other features, such signals collectively being referred to as clutter. Moreover, depending on the depth of the boring tool and the propagation characteristics of the intervening ground medium, the signal from the boring tool can be extremely weak relative to the clutter signal. Consequently, the boring tool signal may either be misinterpreted or even go undetected.

It would be desirable to employ an apparatus, such as a GPR system, for locating an underground boring tool in three dimensions and with higher accuracy than is currently attainable given the present state of the technology. However, for the reasons given above, no trenchless boring system has yet been made available, that provides for high precision location of an underground boring tool.

SUMMARY OF THE INVENTION

The present invention relates to an apparatus and method for locating an underground boring tool by employment of a radar-like probe and detection technique. The boring tool is provided with a device which generates a specific signature signal in response to a probe signal transmitted from above the ground. Cooperative action between the probe signal transmitter at ground level and the signature signal generating device provided within the underground boring tool results in accurate detection of the boring tool, despite the presence of a large background signal. Precision detection of the boring tool enables the operator to accurately locate the boring tool during operation and, if provided with a directional capacity, avoid buried obstacles such as utilities and other hazards. The probe signal can be microwave or acoustic.

The signature signal produced by the boring tool may be generated either passively or actively. Further, the signature signal may be produced in a manner which differs from the probe in one or more ways, including timing, frequency content, or polarization.

In accordance with one embodiment, surveying the boring site, either prior to or during the boring operation, provides for the production of data associated with the characteristics of the ground medium subjected to the survey. The ground characteristic data acquired during the survey are correlated with (existing) historical data which relate ground types to boring productivity, hence enabling estimates of boring productivity and overall cost to be made for the site subjected to the survey. Accurate surveys of planned boring pathways can be made and the position of the boring tool accurately measured during a boring operation for contemporaneous or subsequent comparison with the planned pathway. The direction of the boring tool may be adjusted in response to the measured position in order to maintain the boring tool along the planned pathway.

BRIEF DESCRIPTION OF THE DRAWINGS

FIG. 20 illustrates an embodiment of a trenchless underground boring tool incorporating an active beacon and various sensors, and further depicts sensor signal information.

DETAILED DESCRIPTION OF THE EMBODIMENTS

Figure 1:
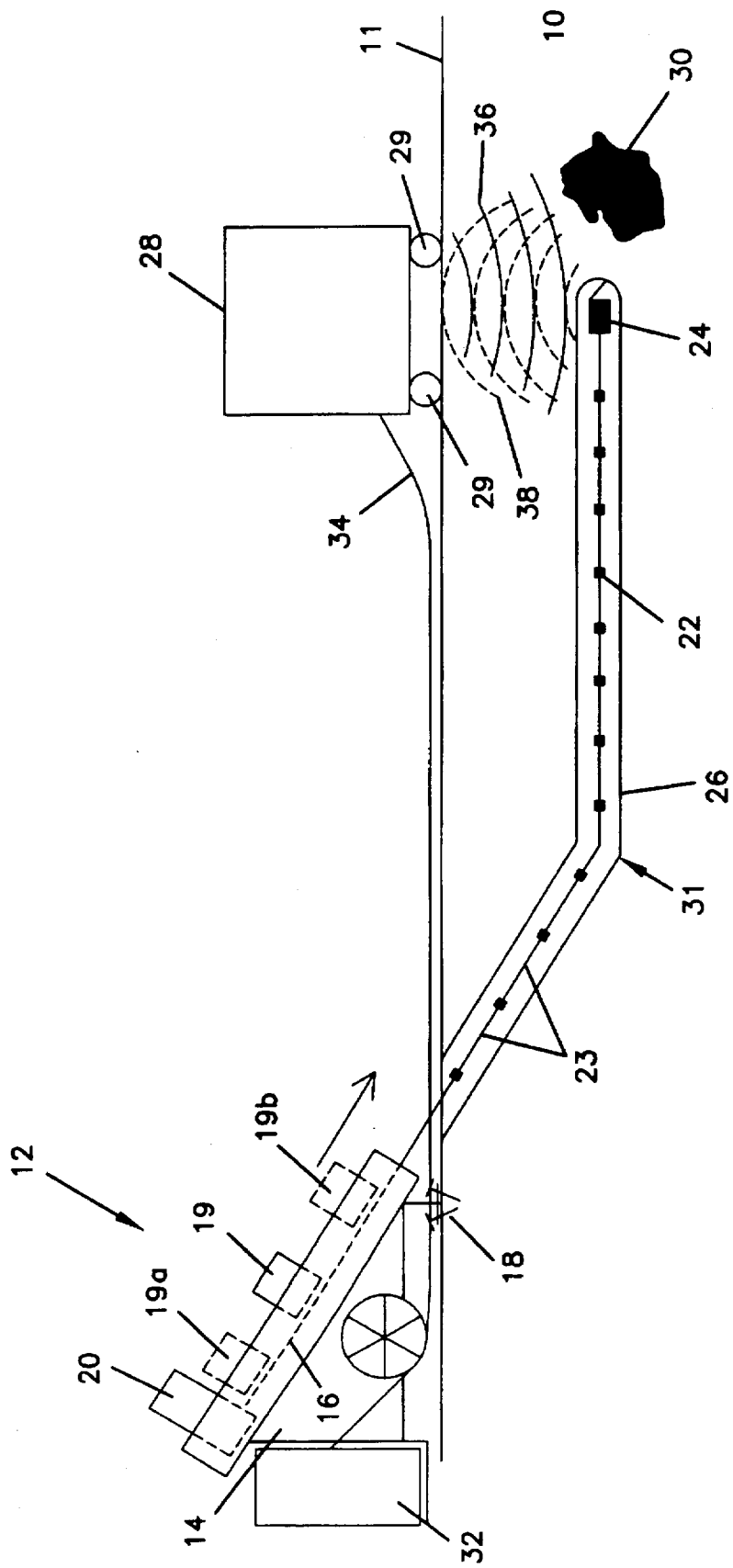
FIG. 1 is a side view of a trenchless underground boring apparatus in accordance with an embodiment of the present invention.

Referring now to the figures and, more particularly, to FIG. 1, there is illustrated an embodiment of a trenchless underground boring system incorporating a detection system for detecting the location of the underground boring tool. FIG. 1 illustrates a cross-section through a portion of ground 10 where the boring operation takes place, with most of the components of the detection system depicted situated above the ground surface 11. The trenchless underground boring system, generally shown as the system 12, includes a platform 14 on which is placed a tilted longitudinal member 16. The platform 14 is secured to the ground by pins 18 or other restraining members in order to prevent the platform 14 from moving during the boring operation. Located on the longitudinal member 16 is a thrust/pullback pump 20 for driving a drill string 22 in a forward, longitudinal direction as generally shown by the arrow. The drill string 22 is made up of a number of drill string members 23 attached end-to-end. Also located on the tilted longitudinal member 16, and mounted to permit movement along the longitudinal member 16, is a rotating motor 19 for rotating the drill string 22 (illustrated in an intermediate position between an upper position 19a and a lower position 19b). In operation, the rotating motor 19 rotates the drill string 22 which has a boring tool 24 at the end of the drill string 22.

The boring operation takes place as follows. The rotating motor 19 is initially positioned in an upper location 19a and rotates the drill string 22. While the boring tool 24 is rotated, the rotating motor 19 and drill string 22 are pushed in a forward direction by the thrust-pullback pump 20 toward a lower position into the ground, thus creating a borehole 26. The rotating motor 19 reaches a lower position 19b when the drill string 22 has been pushed into the borehole 26 by the length of one drill string member 23. A new drill string member 23 is then added to the drill string 22, and the rotating motor 19 is released and pulled back to the upper location 19a. The rotating motor 19 then clamps on to the new drill string member and the rotation/push process repeated so as to force the newly lengthened drill string 22 further into the ground and extend the borehole 26. Commonly, water is pumped through the drill string 22 and back up through the borehole to remove cuttings, dirt, and other debris. If the boring tool 24 incorporates a directional steering capability for controlling its direction, a desired direction can be imparted to the resulting borehole 26. In FIG. 1, there is illustrated a borehole 26 which bends in the vicinity of a point 31 after the initial oblique section becomes parallel to the ground surface 11. Located above the surface 11, and detachable from the trenchless underground boring system 12, is a probing and detection unit 28 (PDU), mounted on wheels 29 or tracks in order to permit above-ground traversing along a path corresponding to the underground path of the boring tool 24. The PDU 28 is coupled to a control unit 32 via a data transmission link 34.

Figure 2:
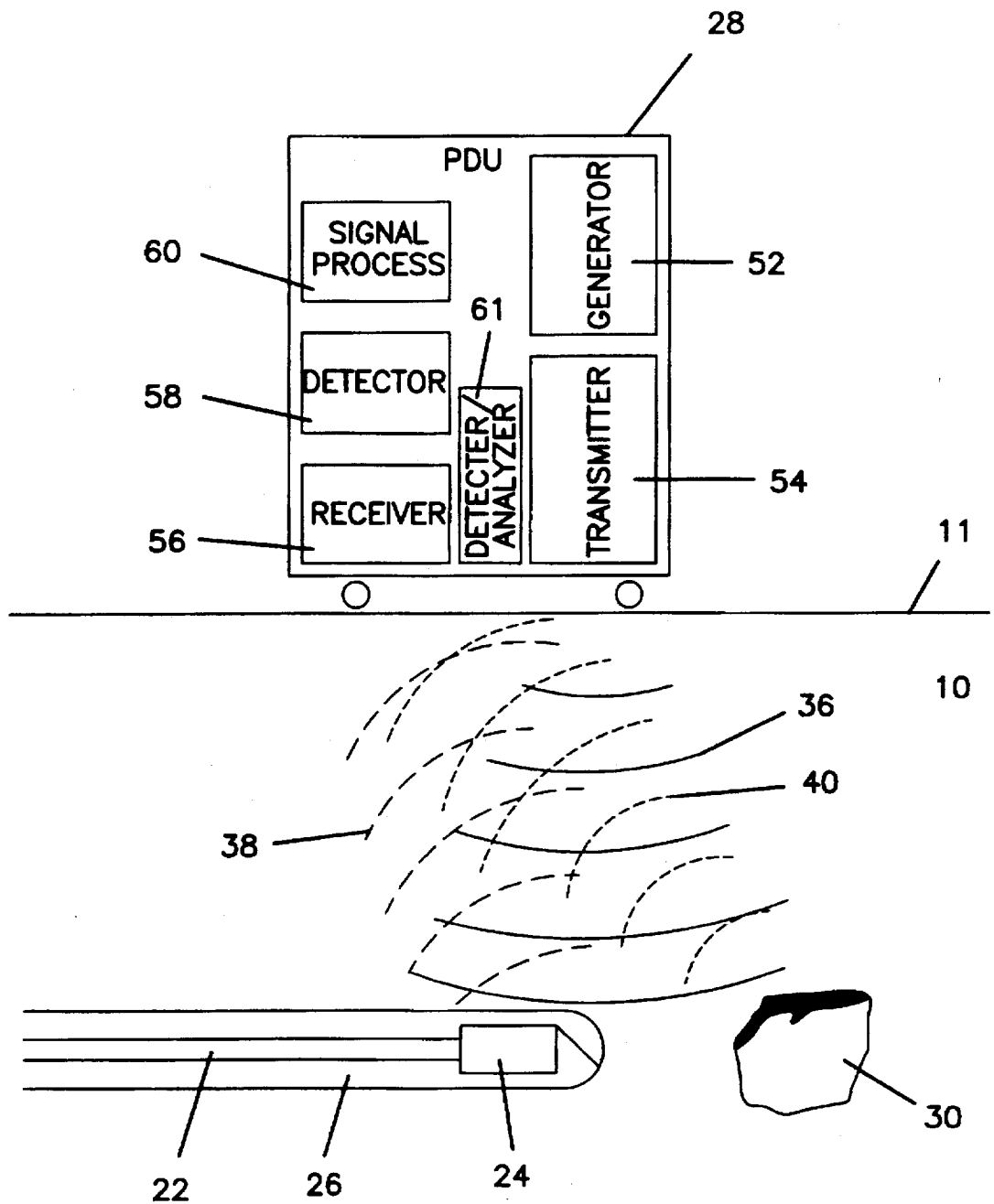
FIG. 2 is a detailed schematic side view of a trenchless underground boring tool and a probe and detection unit of FIG. 1.

The operation of the PDU 28 is more clearly described in reference to FIG. 2. The PDU 28 is generally used to transmit a probe signal 36 into the ground and to detect returning signals. The PDU 28 contains a generator 52 for generating the probe signal 36 which probes the ground 10. A transmitter 54 receives the probe signal 36 from the generator 52, which, in turn, transmits the probe signal 36

(shown as continuous lines in FIG. 2) into the ground 10. In a first embodiment, the generator 52 is a microwave generator and the transmitter 54 is a microwave antenna for transmitting microwave probe signals. In an alternative embodiment, the generator 52 is an acoustic wave generator and produces acoustic waves, and the transmitter 54 is typically a probe placed into the ground 10 to ensure good mechanical contact for transmitting the acoustic waves into the ground 10.

The probe signal 36 is transmitted by the PDU 28, propagates through the ground 10, and encounters subsurface obstructions, one of which is shown as 30, which scatter a return signal 40 (shown as dotted lines in FIG. 2) back to the PDU 28. A signature signal 38 (shown as dashed lines in FIG. 2) is also returned to the PDU 28 from the boring tool 24 located in the borehole 26.

The detection section of the PDU 28 includes a receiver 56, a detector 58, and a signal processor 60. The receiver 56 receives the return signals from the ground 10 and communicates them to the detector 58. The detector 58 converts the return signals into electric signals which are subsequently analyzed in the signal processing unit 60. In the first embodiment described hereinabove in which the probe signal 36 constitutes a microwave signal, the receiver 56 typically includes an antenna, and the detector 58 typically includes a detection diode. In another embodiment in which the probe signal 36 constitutes an acoustic wave, the receiver 56 typically is a probe in good mechanical contact with the ground 10 and the detector 58 includes a sound-to-electrical transducer, such as microphone. The signal processor 60 may include various preliminary components, such as a signal amplifier and an analog-to-digital convertor, followed by more complex circuitry for producing a two or three dimensional image of a subsurface volume which incorporates the various underground obstructions 30 and the boring tool 24. The PDU 28 also contains a beacon receiver/analyzer 61 for detecting and interpreting a signal from an underground active beacon. The function of the beacon receiver/analyzer 61 will be described more fully hereinbelow.

Referring once again to FIG. 1, the PDU 28 transmits acquired information along the data transmission link 34 to the control unit 32, which is illustrated as being located in proximity to the trenchless underground boring system 12. The data transmission link 34 is provided to handle the transfer of data between the PDU 28 and the trenchless underground boring system 12 and may be a co-axial cable, an optical fiber, a free-space link for infrared communication, or some other suitable data transfer medium.

A significant advantage of using a trenchless underground boring system 12 which employs the subsurface detection technique described herein concerns the detection of other important subsurface features which may purposefully be avoided by the boring tool 24, particularly buried utilities such as electric, water, gas, sewer, telephone lines, cable lines and the like.

It is well known in the field of subsurface imaging that conventional underground imaging techniques, such as ground penetrating radar (GPR), detect the presence of many types of underground obstructions and structures. One major difficulty still unaddressed by conventional boring tool detection techniques concerns the present inability to distinguish a boring tool signal from the many return signals, collectively known as clutter, associated with other underground obstructions and structures. The clutter signal constitutes a background noise above which the boring tool signal must be distinguishable. It is understood that the return signal from the boring tool 24 may be weak relative to the clutter, in other words the signal-to-clutter ratio is low, thereby reducing the ability to clearly identify the boring tool signal. The probe and detection apparatus and method of the present invention advantageously provides for the production of a boring tool return signal having a characteristic signature which can be more easily distinguished from the clutter. The generation of a signature signal may be performed either passively or actively. This signature signal generation, in accordance with one embodiment, is illustrated in FIGS. 3 and 4.

Figure 3:
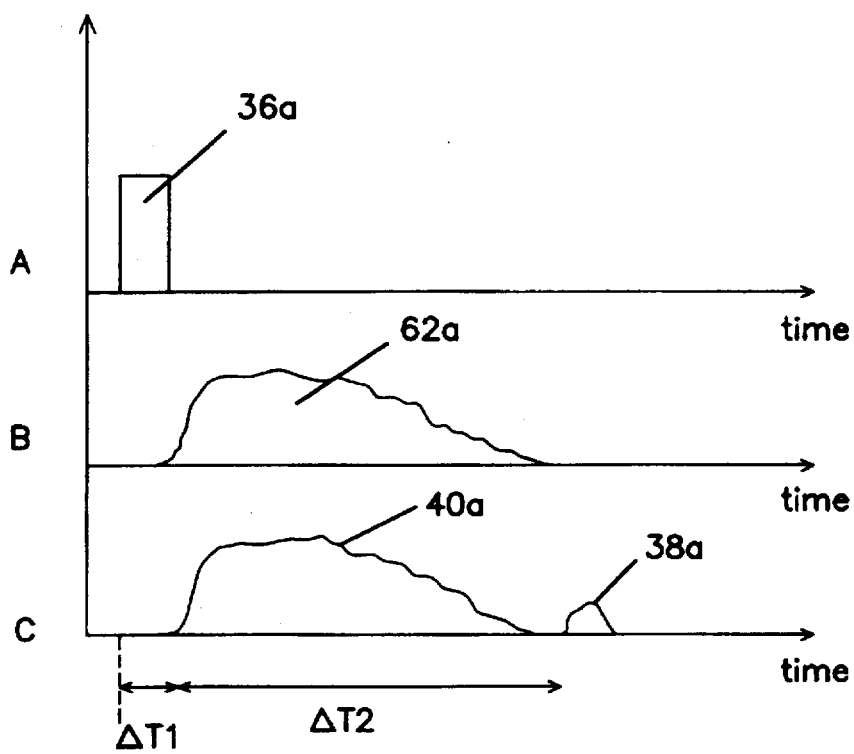
FIG. 3 is a graph depicting time domain signature signal generation.

FIG. 3 is an illustration depicting the generation and detection of a boring tool signature signal in the time domain. Line A shows the emission of a probe signal 36a as a function of signal plotted against time. Line B shows a return signal 62a detected by the PDU 28 in the absence of any signature signal generation. The return signal 62a is depictive of a signal received by the PDU 28 at a time ΔT1 after emission of the probe signal 36a, and is represented as a commixture of signals returned from the boring tool 24 and other scatterers. As previously discussed, a low signal-to-clutter ratio makes it very difficult to distinguish the return signal from the boring tool 24. Line C illustrates an advantageous detection technique in which co-operation between the boring tool 24 and the PDU 28 is employed to produce and transmit a boring tool signature signal at a certain time ΔT2 following illumination with the probe signal 36a. In accordance with this detection scheme, the return signal 40a received from the scatterers is detected initially, and the signature signal 38a received from the boring tool 24 is detected after a delay of ΔT2. The delay time ΔT2 is established to be sufficiently long so that the boring tool signature signal is significantly more pronounced than the clutter signal at the time of detection. In this case, the signal-to-clutter ratio of the boring tool signature signal 38a is relatively high, thus enabling the signature signal 38a to be easily distinguished from the background clutter 40a.

Figure 4:
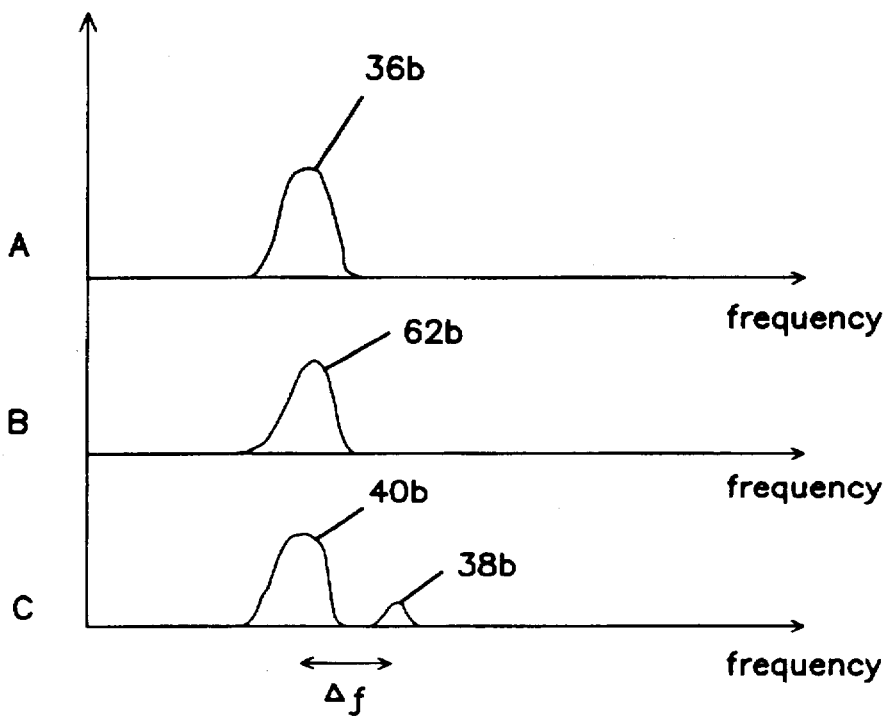
FIG. 4 is a graph depicting frequency domain signature signal generation.

FIG. 4 is an illustration depicting the detection of a boring tool signature signal in the frequency domain. Line A illustrates the frequency band 36b of the probe signal as a function of signal strength plotted against frequency. Line B shows a frequency band 62b of a return signal from the boring tool 24 in the absence of any cooperative signal generation. It can be seen that the return signals from the boring tool 24 and other scatterers 30 share a frequency band 62b similar to that of the probe signal 36b. Line C illustrates a case where co-operation is employed between the boring tool 24 and the PDU 28 to produce and transmit a boring tool signature signal which has a frequency band 38b different from that of the scattered return signal 40b. The difference in frequency band, indicated as Δf, is sufficiently large to move the boring tool signature signal out of the scattered signal frequency band 40b. Thus, the boring tool signature signal can be detected with relative ease due to the increased signal-to-clutter ratio. It is noted that high or low pass filtering techniques or other similar filtering methods may be employed to enhance boring tool signature signal detection.

It is an important feature of the invention that the boring tool 24 includes a signature signal-generating apparatus which produces a signature signal in response to a probe signal received from the PDU 28. If no such signature signal was produced by the generating apparatus, the PDU 28 would receive an echo from the boring tool 24 which would be very difficult to distinguish from the clutter with a high degree of certainty using conventional detecting techniques.

The incorporation of a signature signal generating apparatus advantageously provides for the production of a unique signal by the boring tool 24 that is easily distinguishable from the clutter and has a relatively high signal-to-clutter ratio. As discussed briefly above, an active or passive approach is suitable for generating the cooperative signature signal. An active signature signal circuit is one in which the circuit used to generate the signature signal requires the application of electrical power from an external source, such as a battery, to make it operable. A passive circuit is one which does not have an external source of power. The source of energy for the electrical signals present in a passive circuit is the received probe signal itself.

In accordance with the passive approach, the boring tool 24 does not include an active apparatus for generating or amplifying a signal and is therefore the simpler approach since it does not require the presence of a power source or electronic circuitry in the head of the boring tool 24. Alternatively, an active approach may be employed which has the advantage that it is more flexible and provides the opportunity to produce a wider range of signature response signals which may be more identifiable when boring through different types of ground medium. Further, an active approach may reduce the complexity and cost of the signature signal receiving apparatus.

Figure 5A:
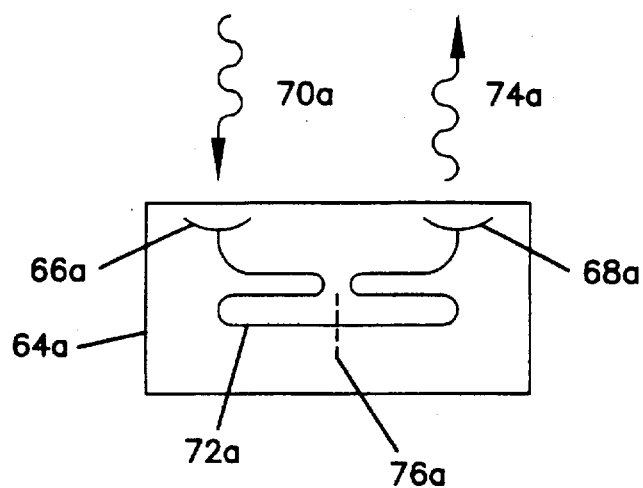
FIG. 5 shows three embodiments for passive microwave signature signal generation.
Figure 5B:
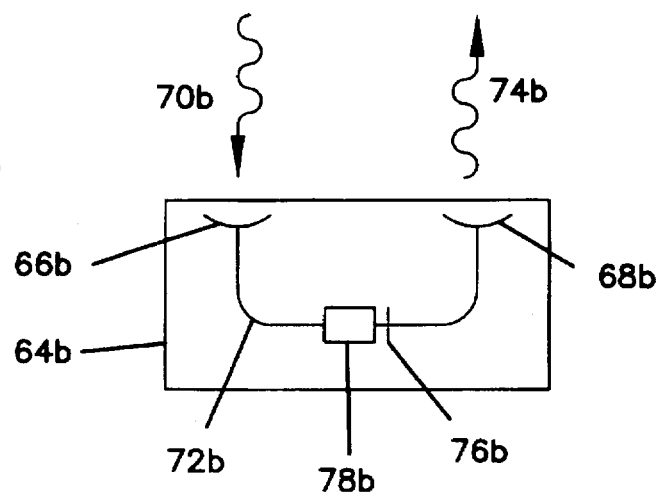
Figure 5C:
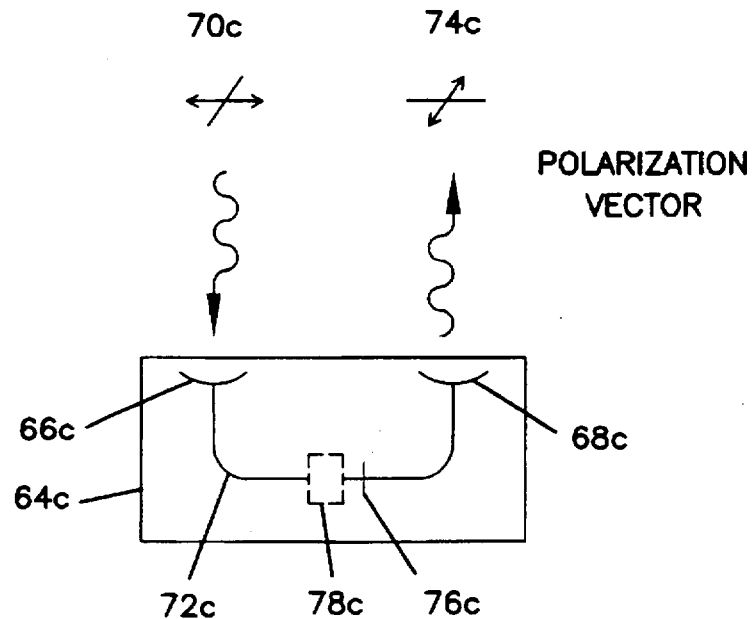

Three embodiments of passive signature signal generating apparatus associated with a microwave boring tool detection technique are illustrated in FIG. 5. Each embodiment shown in FIG. 5 includes a schematic of a boring tool 24 containing microwave antennae and circuit components which are used to generate the signature signal. The three embodiments illustrated in FIGS. 5a, 5b, and 5c are directed toward the generation of the signature signal using a) the time domain, b) the frequency domain and c) cross-polarization, respectively. In FIG. 5a, there is illustrated a boring tool head 64a which includes two antennae, a probe signal receive antenna 66a and a signature signal transmit antenna 68a. For purposes of illustration, these antennae are illustrated as separate elements, but it is understood that microwave transmit/receive systems can operate using a single antenna for both reception and transmission. Two separate antennae are used in the illustration of this and the following embodiments only in order to enhance the understanding of the invention and no limitation of the invention is to be inferred therefrom. The receive antenna 66a and the transmit antenna 68a in the physical embodiment of the signature signal generator will preferably be located inside the boring tool 24 or on its surface in a conformal configuration. For antennae located within the boring tool 24, it is understood that at least a portion of the boring tool 24 is made of a non-metallic material, preferably a hard dielectric, thus allowing passage of the microwaves into the boring tool 24 from the ground medium 10. A material suitable for this application is KEVLAR The illustration of FIG. 5a shows the signature signal generation apparatus for a microwave detection system operating in the time domain. In accordance with this embodiment, a receive antenna 66a receives a probe signal 70a from the PDU 28, such as a short microwave burst lasting a few nanoseconds, for example. In order to distinguish a signature signal 74a from the clutter received by the PDU 28, the received probe signal 70a passes from the receive antenna 66a into a time-delaying waveguide 72a, preferably a co-axial cable, to a transmit antenna 68a. The signature signal 74a is then radiated from the transmit antenna 68a and received by the PDU 28. The use of the time-delay line, which preferably delays the response from the boring tool 24 by about 10 nanoseconds, delays radiating the return signature signal 74a until after the clutter signal received by the PDU 28 has decreased in magnitude.

In accordance with another embodiment, a single antenna embodiment of the passive time domain signature generator could be implemented by cutting the waveguide at the point indicated by the dotted line 76a to form a termination. In this latter embodiment, the probe signal 70a propagates along the waveguide 72a until it is reflected by the termination located at the cut 76a, propagates back to the receive antenna 66a, and is transmitted back to the PDU 28. The termination could be implemented either as an electrical short, in which case the probe signal 70a would be inverted upon reflection, or as an open circuit, in which case the probe signal 70a would not be inverted upon reflection.

The introduction of a time delay to create the signature signal 74a makes the boring tool 64a appear deeper in the ground than it is in actuality. Since microwaves are heavily attenuated by the ground, ground penetrating radar systems have a typical effective depth range of about 10 feet, beyond which point the signal returns are too heavily attenuated to be reliably detected. The production of a time delayed signature signal return 74a from the boring tool 64a artificially translates the depth of the boring tool 24 to an apparent depth in the range of 10 to 20 feet, a depth from which there is no other strong signal return, thus significantly enhancing the signal-to-clutter ratio of the detected signature signal 74a.

The illustration of FIG. 5b depicts a signature signal generating apparatus for a microwave detection system operating in the frequency domain. In accordance with this embodiment, a receive antenna 66b, located in the boring tool 64b, receives a microwave probe signal 70b from the PDU 28. The probe signal 70b is preferably a microwave burst, lasting for several microseconds, which is centered on a given frequency, f, and has a bandwidth of $\Delta f1$, where $\Delta f1/f$ is typically less than 1 percent. In order to shift a return signature signal 74b out of the frequency regime associated with the clutter received by the PDU 28, the received probe signal 70b propagates from the receive antenna 66b along a waveguide 72b into a nonlinear electrical device 78b, preferably a diode, which generates harmonic signals, such as second and third harmonics, from an original signal. The harmonic signal is then radiated from a transmit antenna 68b as the signature signal 74b and is received by the PDU 28. The PDU 28 is tuned to detect a harmonic frequency of the probe signal 70b. For a probe signal 70b of 100 MHz, for example, a second harmonic detector would be tuned to 200 MHz. Generally, scatterers are linear in their response behavior and generate a clutter signal only at a frequency of that of the probe signal 70b. Since there is generally no other source of the harmonic frequency present, the signal-to-clutter ratio of the signature signal 74b at the harmonic frequency is relatively high. In a manner similar to that discussed hereinabove with respect to the passive time domain embodiment, the passive frequency domain embodiment may be implemented using a single antenna by cutting the waveguide at the point indicated by the dotted line 76b to form a termination. In accordance with this latter embodiment, the probe signal 70b would propagate along the waveguide 72b, through the nonlinear element 78b, reflect at the termination 76b, propagate back through the nonlinear element 78b, propagate back to the receive antenna 66b, and be transmitted back to the PDU 28. The polarity of the reflection would be determined by the nature of the termination, as discussed hereinabove.

The illustration of FIG. 5c depicts signature signal generation for a microwave detection system operating in a cross-polarization mode. In accordance with this embodiment, the PDU 28 generates a probe signal 70c of a specific linear polarity which is then transmitted into the ground. The clutter signal is made up of signal returns from scatterers which, in general, maintain the same polarization as that of the probe signal 70c. Thus, the clutter signal has essentially the same polarization as the probe signal 70c. A signature signal 74c is generated in the boring tool 64c by receiving the polarized probe signal 70c in a receive antenna 66c, propagating the signal through a waveguide 72c to a transmit antenna 68c, and transmitting the signature signal 74c back to the PDU 28. The transmit antenna 68c is oriented so that the polarization of the radiated signature signal 74c is orthogonal to that of the received probe signal 70c. The PDU 28 may also be configured to preferentially receive a signal whose polarization is orthogonal to that of the probe signal 70c. As such, the receiver 56 preferentially detects the signature signal 74c over the clutter signal, thus improving the signature signal-to-clutter ratio.

In a manner similar to that discussed hereinabove with respect to the passive time and frequency domain embodiments, the cross-polarization mode embodiment may be implemented using a single antenna by cutting the waveguide at the point indicated by the dotted line 76c to form a termination and inserting a polarization mixer 78c which alters the polarization of the wave passing therethrough. In this latter embodiment, the probe signal would propagate along the waveguide 72c, through the polarization mixer 78c, reflect at the termination 76c, propagate back through the polarization mixer 78c, propagate back to the receive antenna 66c and be transmitted back to the PDU 28. The polarity of the reflection may be determined by the nature of the termination, as discussed previously hereinabove. It is understood that an antenna employed in the single antenna embodiment would be required to have efficient radiation characteristics for orthogonal polarizations. It is further understood that the cross-polarization embodiment may employ circularly or elliptically polarized microwave radiation. It is also understood that the cross-polarization embodiment may be used in concert with either the passive time domain or passive frequency domain signature generation embodiments described previously with reference to FIGS. 5a and 5b in order to further enhance the signal-to-clutter ratio of the detected signature signal.

Referring now to FIG. 6, active signature signal generation embodiments will be described. FIG. 6a illustrates an embodiment of active time domain signature signal generation suitable for incorporation in a boring tool 80a. The embodiment illustrated shows a probe signal 82a being received by a receive antenna 84a which is coupled to a delay-line waveguide 86a. An amplifier 88a is located at a point along the waveguide 86a, and amplifies the probe signal 82a as it propagates along the waveguide 86a. The amplified probe signal continues along the delay-line waveguide 86a to the transmit antenna 90a which, in turn, transmits the signature signal 92a back to the PDU 28. FIG. 6b illustrates an alternative embodiment of the active time domain signature generator which incorporates a triggerable delay circuit for producing the time-delay, rather than propagating a signal along a length of time-delay waveguide. The embodiment illustrated shows a probe signal 82b being received by a receive antenna 84b coupled to a waveguide 86b. A triggerable delay circuit 88b is located at a point along the waveguide 86b. The triggerable delay circuit 88b operates in the following fashion. The triggerable delay circuit 88b is triggered by the probe signal 82b which, upon initial detection of the probe signal 82b, starts an internal timer circuit. Once the timer circuit has reached a predetermined delay time, preferably in the range 1–20 nanoseconds, the timer circuit generates an output signal from the triggerable delay circuit 88b which is used as a signature signal 92b. The signature signal 92b propagates along the waveguide 86b to a transmit antenna 90b which then transmits the signature signal 92b to the PDU 28.

Figure 6A:
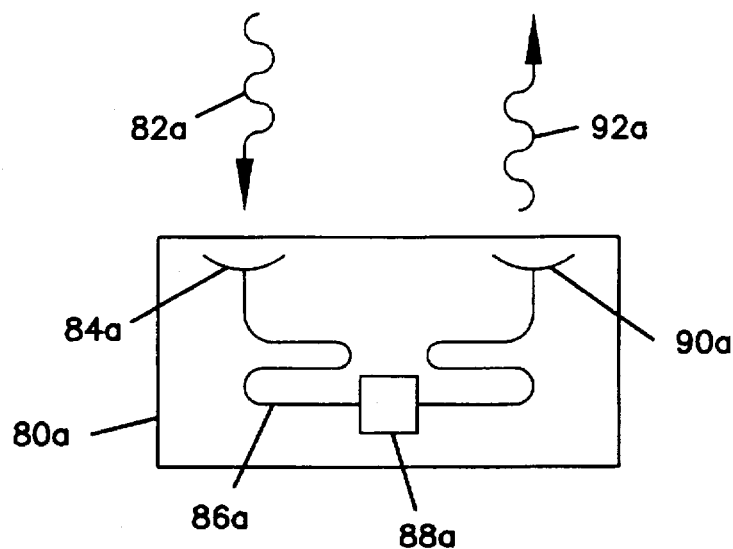
FIG. 6 shows four embodiments for active microwave signature signal generation.
Figure 6B:
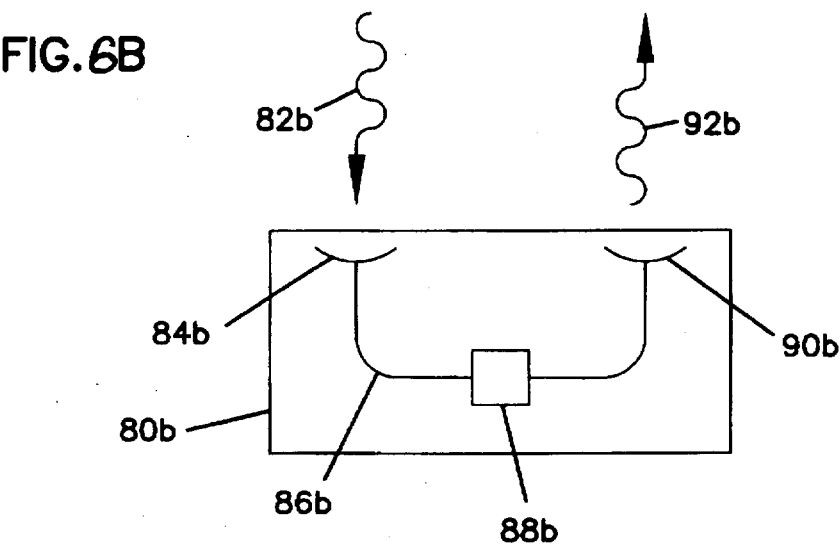
Figure 6C:
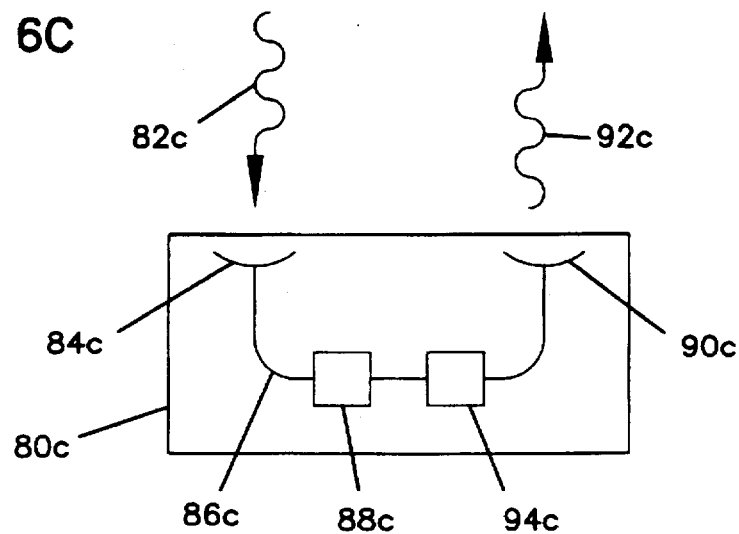

FIG. 6c illustrates an embodiment of an active frequency domain signature generator suitable for incorporation in a boring tool 80c. The embodiment illustrated shows a probe signal 82c being received by a receive antenna 84c coupled to a waveguide 86c and a nonlinear element 88c. The frequency-shifted signal generated by the nonlinear element 88c is then passed through an amplifier 94c before being passed to the transmit antenna 90c, which transmits the signature signal 92c to the PDU 28. An advantage to using an active frequency domain signature signal generation embodiment over a passive frequency domain signature signal generation embodiment is that the active embodiment produces a stronger signature signal which is more easily detected.

In a second embodiment of the active frequency domain signature signal generator generally illustrated in FIG. 6c a probe signal 82c passes through the amplifier 94c prior to reaching the nonlinear element 88c. An advantage of this alternative embodiment is that, since the amplification process may take place at a lower frequency, the amplifier may be less expensive to implement.

Figure 6D:
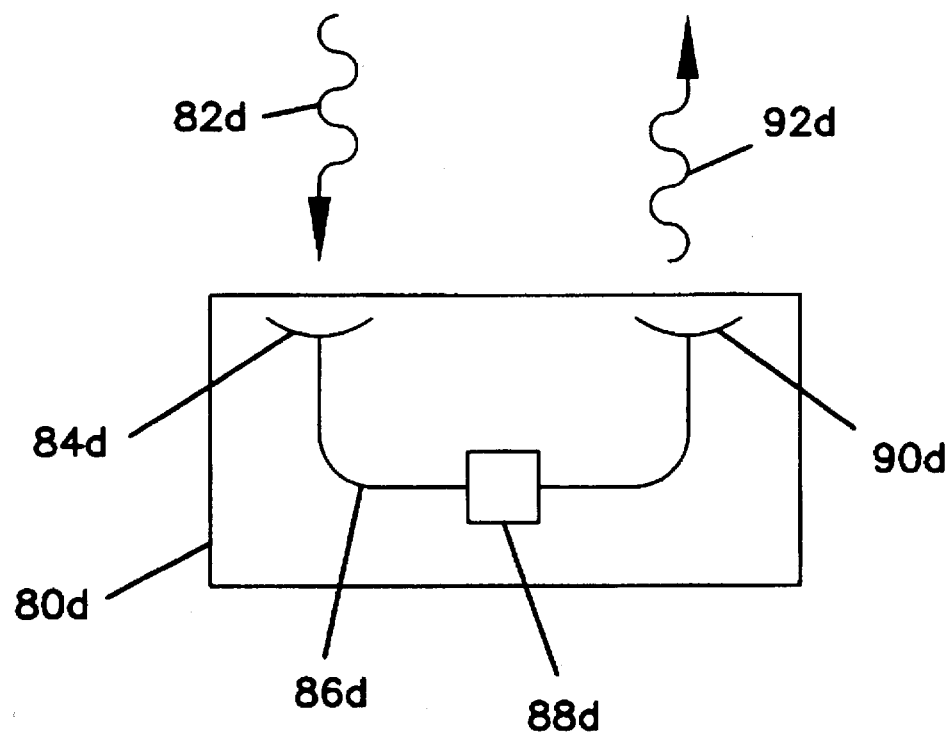

A third embodiment of an active frequency domain signature generator adapted for use in a boring tool 80d is illustrated in FIG. 6d. FIG. 6d shows a receive antenna 84d coupled through use of a waveguide 86d to a frequency shifter 88d and a transmit antenna 90d. The frequency shifter 88d is a device which produces an output signal 92d having a frequency of f2, which is different from the frequency, f1, of an input signal 82d by an offset $\Delta f$, where $f2=f1+\Delta f$. In accordance with this embodiment, $\Delta f$ is preferably larger than one half of the bandwidth of the probe signal 82d, typically on the order of 1 MHz. The frequency shifter 88d produces a sufficient frequency shift to move the signature signal 92d out of the frequency band of the clutter signal, thereby increasing the signal-to-clutter of the detected signature signal 92d. For purposes of describing these embodiments, the term signature signal embraces all generated return signals from the boring tool 24 other than the natural reflection of the probe signal off of the boring tool 24.

Figure 7A:
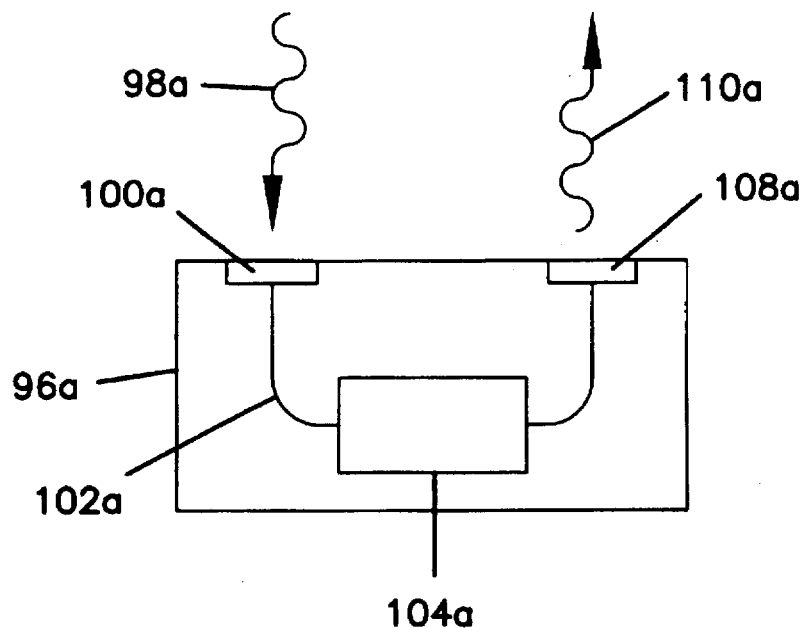
FIG. 7 shows two embodiments for active acoustic signature signal generation.

FIG. 7 illustrates an embodiment of a signature signal generator adapted for use in a boring tool 96 where the probe signal is an acoustic signal. In an acoustic time-domain embodiment illustrated in FIG. 7a, an acoustic probe signal 98a, preferably an acoustic impulse, is received and detected by an acoustic receiver 100a mounted on the inner wall of the boring tool 96a. The acoustic receiver 100a transmits a trigger signal along a trigger line 102a to a delay pulse generator 104a. After being triggered, the delay pulse generator 104a generates a signature pulse following a triggered delay. The signature pulse is passed along the transmitting line 106a to an acoustic transmitter 108a, also mounted on the inner wall of the boring tool 96a. The acoustic transmitter 108a then transmits an acoustic signature signal 110a through the ground for detection by the PDU 28.

Figure 7B:
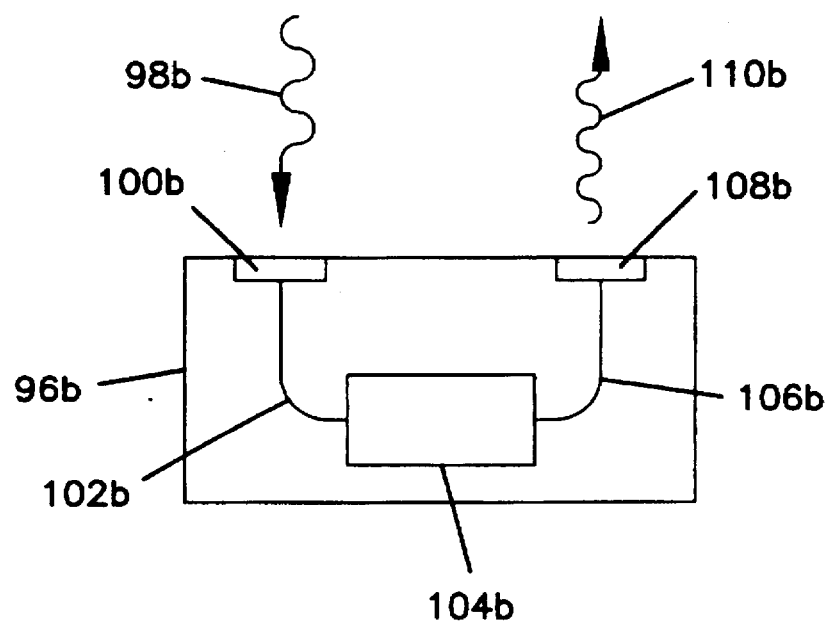

In accordance with an acoustic frequency-domain embodiment as is illustrated in FIG. 7b, an acoustic probe signal 98b, preferably an acoustic pulse having a given acoustic frequency f3, is received and detected by an acoustic receiver 100b mounted on the inner wall of the boring tool 96a. The acoustic receiver 100b transmits an input electrical signal corresponding to the received acoustic signal 98b at a frequency f3 along a receive line 102b to a frequency shifter 104b. The frequency shifter 104b generates an output electrical signal having a frequency that is shifted by an amount Δf3 relative to that of the input signal 98b. The output signal from the frequency shifter 104b is passed along a transmit line 106b to an acoustic transmitter 108b, also mounted on the inner wall of the boring tool 96b. The acoustic transmitter 108b then transmits the frequency shifted acoustic signature signal 110b through the ground for detection by the PDU 28.

Figure 8:
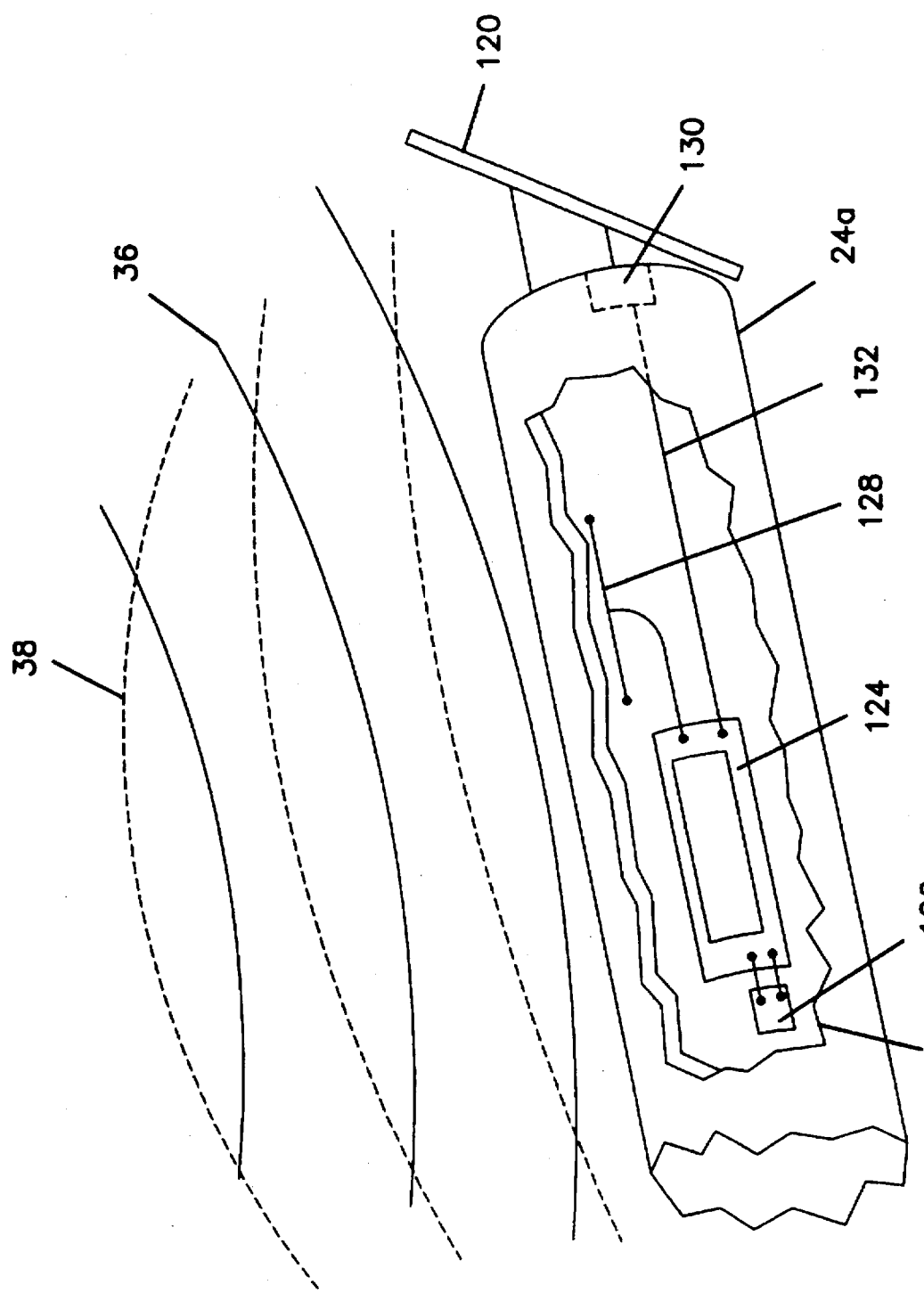
FIG. 8 shows an embodiment of a boring tool incorporating an active microwave signature signal generator.

In FIG. 8, there is illustrated an apparatus for actively generating a signature signal in an underground boring tool 24. There is shown the head of a boring tool 24a. At the front end of the boring tool 24a is a cutter 120 for cutting through soil, sand, clay, and the like when forming an underground passage. A cut-away portion of the boring tool wall 122 reveals a circuit board 124 which is designed to fit inside of the boring tool 24a. Attached to the circuit board 124 is a battery 126 for providing electrical power. Also connected to the circuit board 124 is an antenna 128 which is used to receive an incoming probe signal 36 and transmit an outgoing signature signal 38. The antenna 128 may be located inside the boring tool 24a or may be of a conformal design located on the surface of the boring tool 24a and conforming to the surface contour. The boring tool 24a may also contain one or more sensors for sensing the environment of the boring tool 24a. Circuitry is provided in the boring tool 24a for relaying this environmental information to the control unit 32 situated above-ground. The sensors may be used to measure, for example, the orientation of the boring tool 24a, (pitch, yaw, and roll) or other factors such as the temperature of the cutting tool head or the pressure of water at the boring tool 24a.

In FIG. 8, there is illustrated a sensor 130, such as a pressure sensor, located behind the cutter 120. An electrical connection 132 runs from the sensor 130 to the circuit board 124 which contains circuitry for analyzing the signal received from the sensor 130. The circuit board 124 may modulate the signature signal 38 to contain information relating to the sensor output or, alternatively, may generate separate sensor signals which are subsequently detected and analyzed above-ground.

Figure 9:
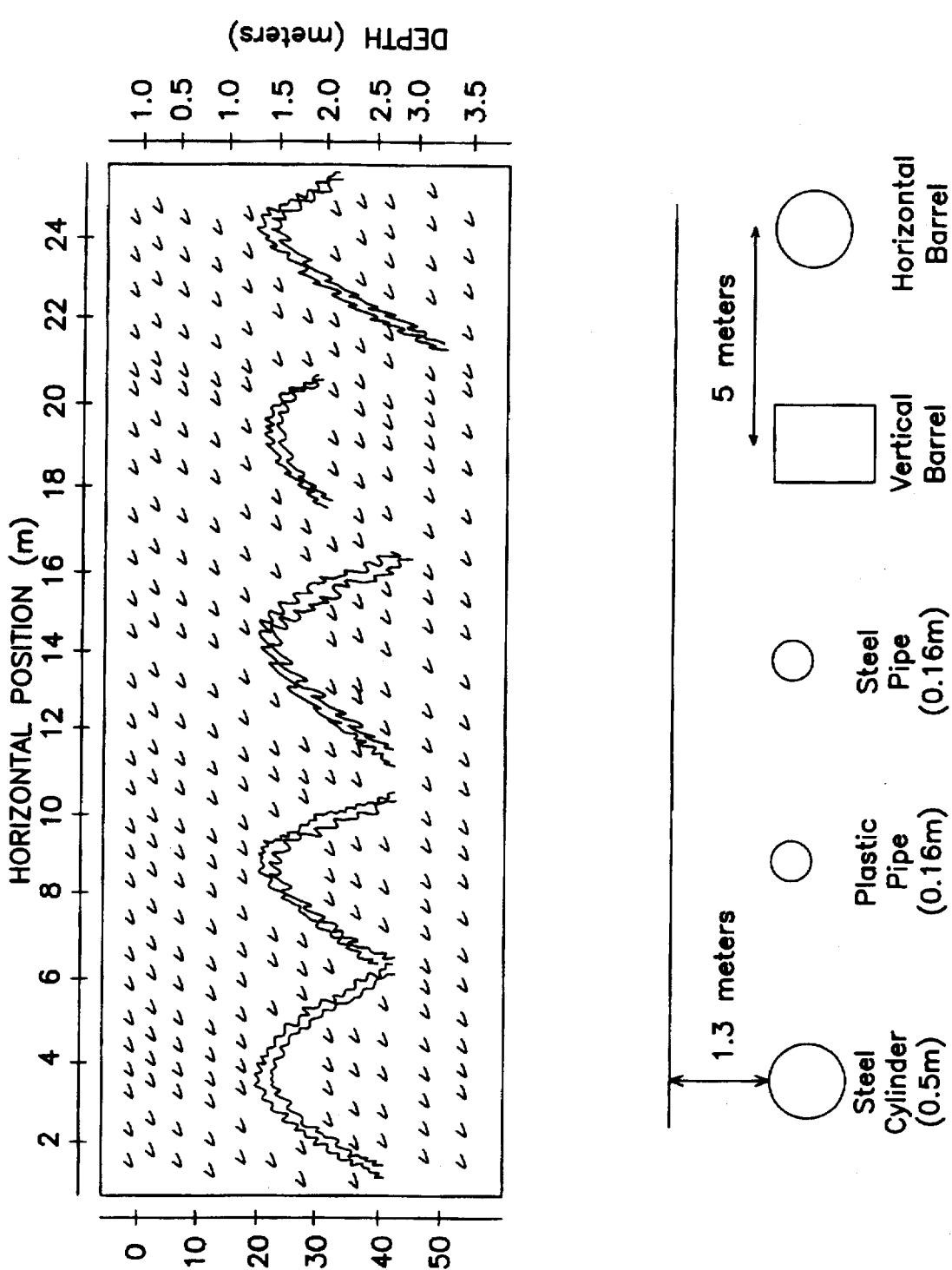
FIG. 9 is an illustration of reflected signals received by a ground penetrating radar system for sample buried targets using a single axis antenna system.

It is known in the art of subsurface imaging that a single traversal of a GPR unit over a section of ground yields two-dimensional data when the GPR employs a single transmitter and receiver. FIG. 9 shows a plot of GPR system data acquired over a sample test site having five different man-made hazards buried at a depth of approximately 1.3 meters (m) in sandy soil with a water table located at a depth of approximately 4 to 5 m. It is noted that the data illustrated in FIG. 9 are representative of data typically obtainable by the use of a PulseEKKO 1000 system manufactured by Sensors and Software Inc., using conventional single-axis 450 MHz center frequency antennas. Other GPR systems which may suitable for this application include SIR System-2 and System 10A manufactured by Geophysical Survey Systems Inc. and model 1000B STEPPED-FM Ground Penetrating Radar manufactured by GeoRadar Inc.

Each of the buried hazards illustrated in FIG. 9 has associated with it a characteristic hyperbolic time-position curve. The apex of the characteristic hyperbolic curve provides an indication of both the position and depth of a buried hazard. It can be seen from the graph on FIG. 9 that each of the hazards is buried at a depth of approximately 1.3 m below the ground surface with each of the hazards being separated from adjacent hazards by a horizontal distance of approximately 5 m. The GPR system data illustrated in FIG. 9 represent geological imaging data acquired using a conventional single-axis antenna system and, as such, only provides for a two-dimensional representation of the subsurface being probed. As will be discussed hereinbelow, a multiple antenna configuration arranged in an orthogonal orientation provides for an enhanced three-dimensional view of the subsurface geology associated with a particular boring site.

The two-dimensional data of FIG. 9 are displayed as a number of images represented in graphical form as object depth vs. position in the direction of travel. In order to obtain three-dimensional data, a GPR system employing single-axis antenna must make several traverses over the section of ground or must use multiple antennae. The following describes the formation of two and three dimensional images using GPR.

Figure 10:
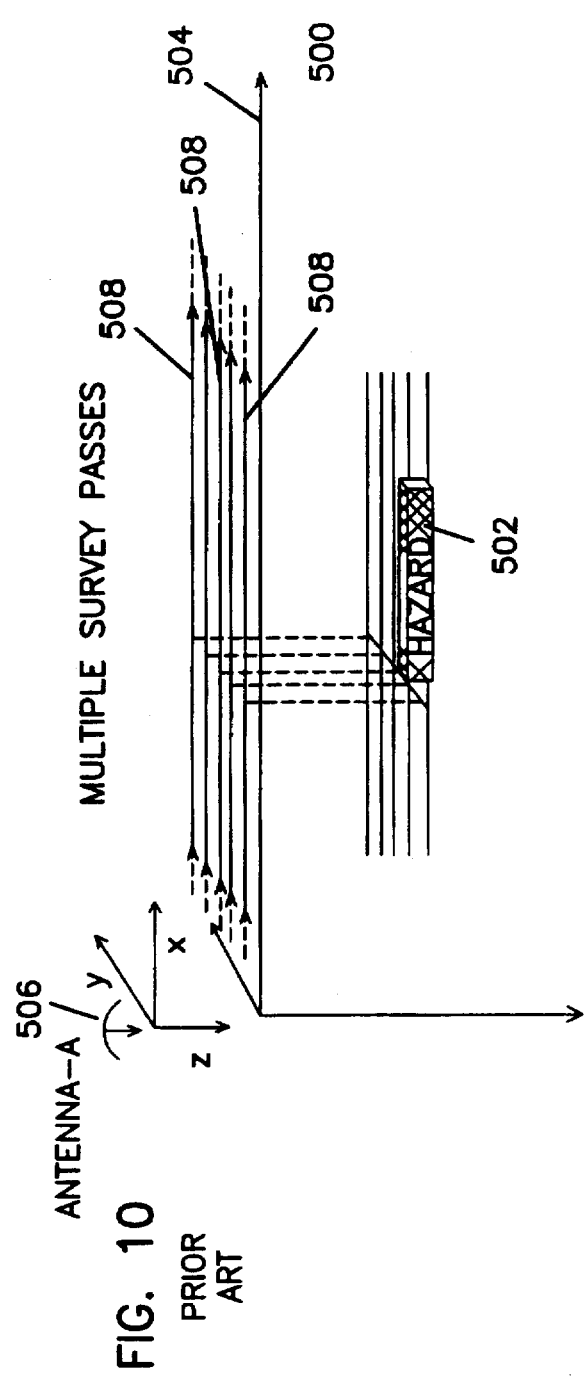
FIG. 10 is an illustration of a conventional single-axis antenna system typically used with a ground penetrating radar system for providing two-dimensional subsurface geologic imaging.

In FIG. 10, there is shown a section of ground 500 for which a GPR forms an image, with a buried hazard 502 located in the section of ground 500. The ground surface 504 lies in the x-y plane formed by axes x and y, while the z-axis is directed vertically into the ground 500. Generally, a single-axis antenna, such as the one illustrated as antenna-A 506 and oriented along the z-axis, is employed to perform multiple survey passes 508. The multiple survey passes 508 are straight line passes running parallel to each other and have uniform spacing in the y-direction. The multiple passes shown in FIG. 10 run parallel to the x-axis. Generally, a GPR system has a time measurement capability which allows measuring of the time for a signal to travel from the transmitter, reflect off of a target, and return to the receiver. This is generally known as a time-of-flight technique, since it measures the duration of time during which the radar pulse is in flight between the transmitter and the receiver. Calculations can be used to convert this time value to a distance measurement that represents the depth of the target. These calculations are based upon field-determined values for characteristic soil properties, such as the dielectric constant and wave velocity through a particular soil type. A simplified technique that can be used when calibrating the depth measurement capabilities of a particular GPR system involves coring a sample target, measuring its depth, and relating it to the number of nanoseconds it takes for a wave to propagate.

After the time function capability of the GPR system provides the operator with depth information, the radar system is moved laterally in a horizontal direction parallel to the x-axis, thus allowing for the construction of a two-dimensional profile of a subsurface. By performing multiple survey passes 508 in a parallel pattern over a particular site, a series of two-dimensional images can be accumulated to produce an estimated three-dimensional view of the site within which a buried hazard may be located. It can be appreciated, however, that the two-dimensional imaging capability of a conventional antenna configuration 506 may result in missing a buried hazard, particularly when the hazard 502 is parallel to the direction of the multiple survey passes 508 and lies in between adjacent survey passes 508.

Figure 11:
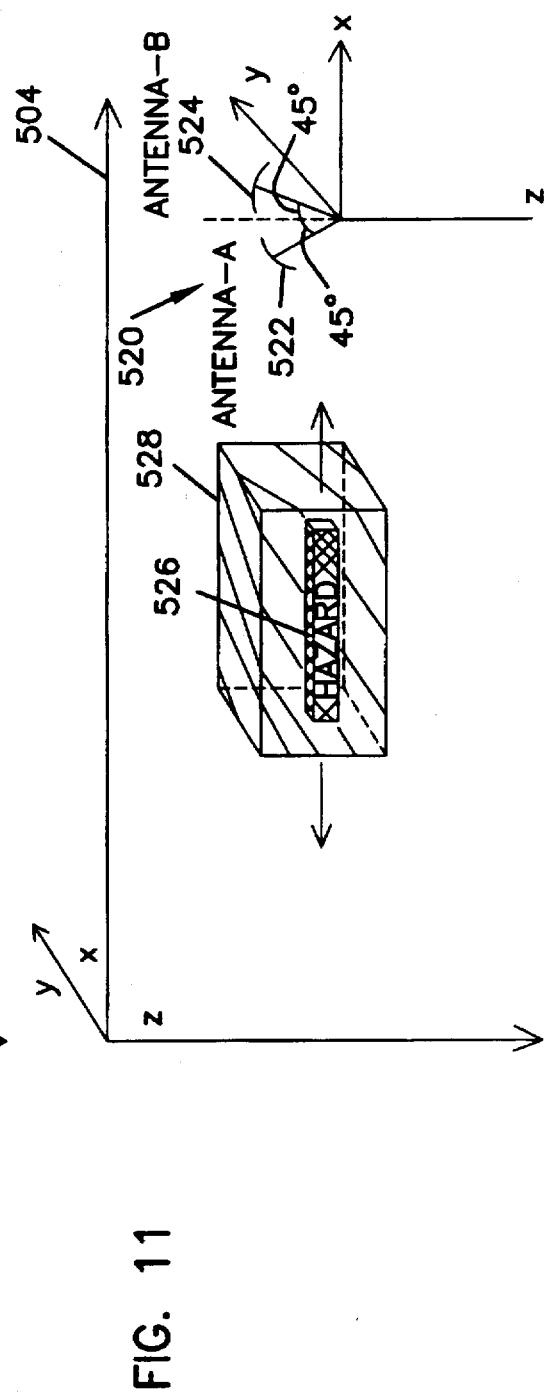
FIG. 11 is an illustration of a novel antenna system including a plurality of antennae oriented in an orthogonal relationship for use with a ground penetrating radar system to provide three-dimensional subsurface geologic imaging.

A significant advantage of a geologic imaging antenna configuration 520 of the present invention provides for true three-dimensional imaging of a subsurface as shown in FIG. 11. A pair of antennae, antenna-A 522 and antenna-B 524, are preferably employed in an orthogonal configuration to provide for three-dimensional imaging of a buried hazard 526. Antenna-A 522 is shown as directed along a direction contained within the y-z axis and at +45° relative to the z-axis. Antenna-B 524 is also directed along a direction contained within the y-z plane, but at −45° relative to the z-axis, in a position rotated 90° from that of antenna-A 522. It is noted that the hyperbolic time-position data distribution, as shown in FIG. 9 and obtained by use of a conventional single-axis antenna, may instead be plotted as a three-dimensional hyperbolic shape that provides width, depth, and length dimensions of a detected buried hazard 526. It is further noted that a buried hazard 526, such as a drainage pipeline, which runs parallel to the survey path 528 will immediately be detected by the three-dimensional imaging GPR system. Respective pairs of orthogonally oriented transmitting and receiving antennae are employed in the transmitter 54 and receiver 56 of the PDU 28 in accordance with one embodiment of the invention.

Figure 12:
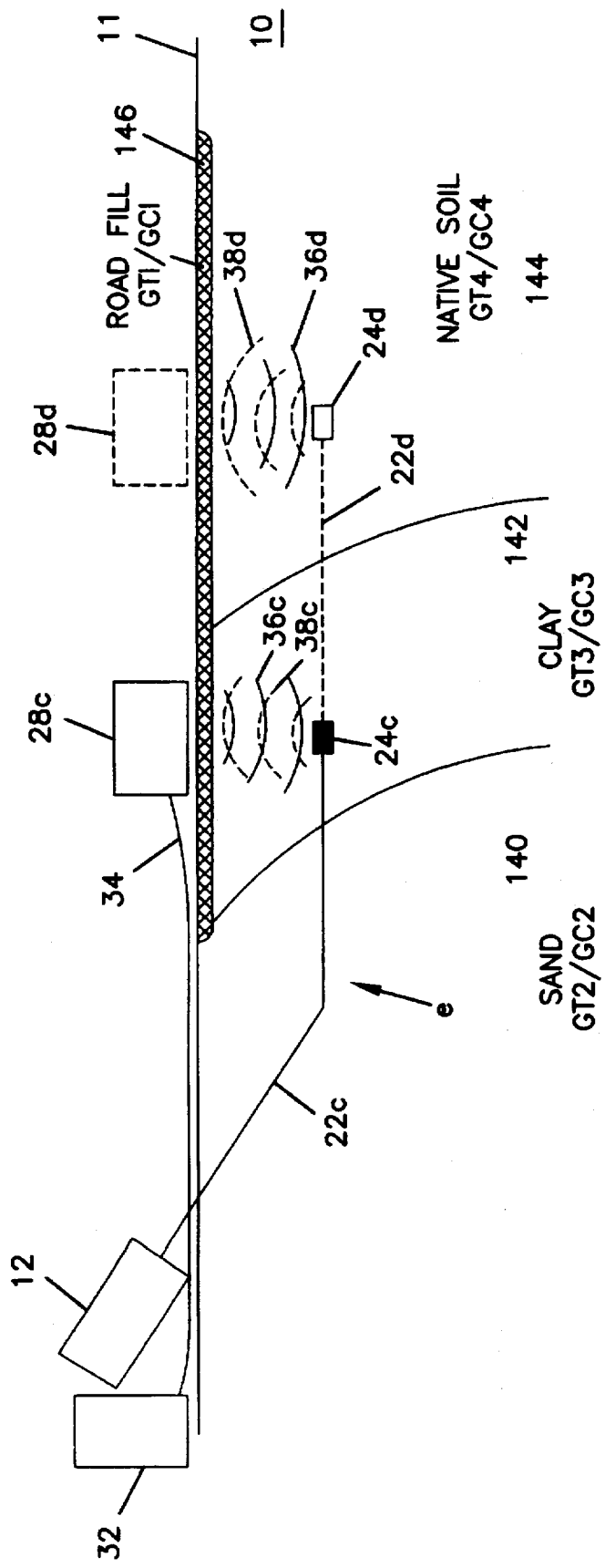
FIG. 12 is an illustration of a boring site having a heterogeneous subsurface geology.

In FIG. 12, there is illustrated an embodiment for using a detection system to locate an underground boring tool and to characterize the intervening medium between the boring head and the PDU 28. In this figure, there is illustrated a trenchless underground boring system 12 situated on the surface 11 of the ground 10 in an area in which the boring operation is to take place. A control unit 32 is located near the trenchless underground boring system 12. In accordance with this illustrative example, a boring operation is taking place under a roadway. The ground 10 is made up of several different ground types, the examples as shown in FIG. 12 being sand (ground type (GT2)) 140, clay (GT3) 142 and native soil (GT4) 144. The road is generally described by the portion denoted as road fill (GT1) 146. FIG. 12 illustrates a drill string 22 in a first position 22c, at the end of which is located a boring tool 24c. The PDU 28c is shown as being situated at a location above the boring tool 24c. The PDU 28c transmits a probe signal 36c which propagates through the road fill and the ground. In the case of the boring tool at location 24c, the probe signal 36c propagates through the road fill 146 and the clay 142. The boring tool 24c, in response, produces a signature signal 38c which is detected and analyzed by the PDU 28c. The analysis of the signature signal 38c provides a measure of the time-of-flight of the probe signal 36c and the signature signal 38c. The time-off-light is defined as a time duration measured by the PDU 28c between sending the probe signal 36c and receiving the signature signal 38c. The time-of-flight measured depends on a number of factors including the depth of the boring tool 24c, the dielectric conditions of the intervening ground medium 146 and 142, and any delay involved in the generation of the signature signal 38c. Knowledge of any two of these factors will yield the third from the time-of-flight measurement.

The depth of the boring tool 24c can be measured independently using a mechanical probe or sensing the pressure of the water at the boring tool 24c using a sensor 130 located in the boring tool head 24c as discussed hereinabove. For the latter measurement, the boring operation is halted, and the water pressure measured. Since the height of the water column in the drill string 22 above the ground is known, the depth of the boring tool 24c can be calculated using known techniques.

For an embodiment of the invention which uses a microwave probe signal, a general relationship for calculating the depth or dielectric constant from the time of flight measurement is:

$$TE = TF - TD = \sum_j \frac{d_j \sqrt{\epsilon_j}}{c} \tag{1}$$

where,

TE is an effective time-of-flight, which is the duration of time during which a probe signal or signature signal is travelling through the ground;

TF is the measured time-of-flight;

TD is the delay internal to the boring tool between receiving the probe signal 36c and transmitting the signature signal 38c; and $d_j$ is the thickness of the jth ground type above the boring tool 24c, $\epsilon_j$ is the average dielectric constant of the jth ground type at the microwave frequency, and c is the speed of light in a vacuum.

For the case where the boring tool is located at position 24c as shown in FIG. 12, and with the assumption that the road fill has a negligible thickness relative to the thickness of clay, the relationship of equation (1) simplifies to:

$$TE = TF - TD = \frac{d_3 \sqrt{\epsilon_3}}{c} \tag{2}$$

where the subscript "3" refers to GT3. Direct measurement of the time-of-flight, TF, and the depth of the boring tool 24c, $d_3$, along with the knowledge of any time delay, TD, will yield the average dielectric constant, $\epsilon_3$, of GT3. This characteristic can be denoted as GC3. It is important to know the dielectric constant since it provides information related to the type of soil being characterized and its water content.

Returning to FIG. 12, there is illustrated an embodiment in which the boring tool 24 has been moved from its first location 24c to another position 24d. The drill string 22d (shown in dashed lines) has been extended from its previous configuration 22c by the addition of extra drill string members in a manner as described previously hereinabove. The PDU 28 has been relocated from its previous position 28c to a new position 28d (shown in dashed lines) in order to be close to the boring tool 24d. The parameter GC4, which represents the ground characteristic of the native soil GT4, can be obtained by performing time-of-flight measurements as previously described using the probe signal 36d and signature signal 38d. Likewise, ground characteristic GC2 can be obtained from time-of-flight measurements made at the point indicated by the letter "e". The continuous derivation of the ground characteristics as the boring tool 24d travels through the ground results in the production of a ground characteristic profile which may be recorded by the control unit 32.

It may be advantageous to make a precise recording of the underground path travelled by the boring tool 24. For example, it may be desirable to make a precise record of where utilities have been buried in order to properly plan future excavations or utility burial and to avoid unintentional disruption of such utilities. Borehole mapping can be performed manually by relating the boring tool position data collected by the PDU 28 to a base reference point, or may be performed electronically using a Geographic Recording System (GRS) 150 shown generally as a component of the control unit 32 in FIG. 13. In one embodiment, a Geographic Recording System (GRS) 150 communicates with a central processor 152 of the control unit 32, relaying the precise location of the PDU 28. Since the control unit 32 also receives information regarding the position of the boring tool 24 relative to the PDU 28, the precise location of the boring tool 24 can be calculated and stored in a route recording database 154.

In accordance with another embodiment, the geographic position data associated with a predetermined underground boring route is preferably acquired prior to the boring operation. The predetermined route is calculated from a survey performed prior to the boring operation. The prior survey includes GPR sensing and geophysical data in order to estimate the type of ground through which the boring operation will take place, and to determine whether any other utilities or buried hazards are located on a proposed boring pathway. The result of the pre-bore survey is a predetermined route data set which is stored in a planned route database 156. The predetermined route data set is uploaded from the planned route database 156 into the control unit 32 during the boring operation to provide autopilot-like directional control of the boring tool 24 as it cuts its underground path. In yet another embodiment, the position data acquired by the GRS 150 is preferably communicated to a route mapping database 158 which adds the boring pathway data to an existing database while the boring operation takes place. The route mapping database 158 covers a given boring site, such as a grid of city streets or a golf course under which various utility, communication, plumbing and other conduits may be buried. The data stored in the route mapping database 158 may be subsequently used to produce a survey map that accurately specifies the location and depth of various utility conduits buried in a specific site. The data stored in the route mapping database 158 also includes information on boring conditions, ground characteristics, and prior boring operation productivity, so that reference may be made by the operator to all prior boring operational data associated with a specific site.

An important feature of the novel system for locating the boring tool 24 concerns the acquisition and use of geophysical data along the boring path. A logically separate Geophysical Data Acquisition Unit 160 (GDAU), which may or may not be physically separate from the PDU 28, may provide for independent geophysical surveying and analysis. The GDAU 160 preferably includes a number of geophysical instruments which provide a physical characterization of the geology for a particular boring site. A seismic mapping module 162 includes an electronic device consisting of multiple geophysical pressure sensors. A network of these sensors is arranged in a specific orientation with respect to the trenchless underground boring system 12, with each sensor being situated so as to make direct contact with the ground. The network of sensors measures ground pressure waves produced by the boring tool 24 or some other acoustic source. Analysis of ground pressure waves received by the network of sensors provides a basis for determining the physical characteristics of the subsurface at the boring site and also for locating the boring tool 24. These data are preferably processed by the GDAU 160 prior to sending analyzed data to the central processor 152.

A point load tester 164 may be employed to determine the geophysical characteristics of the subsurface at the boring site. The point load tester 164 preferably employs a plurality of conical bits for the loading points which, in turn, are brought into contact with the ground to test the degree to which a particular subsurface can resist a calibrated level of loading. The data acquired by the point load tester 164 provide information corresponding to the geophysical mechanics of the soil under test. These data may also be transmitted to the GDAU 160.

The GDAU 160 may also include a Schmidt hammer 166 which is a geophysical instrument that measures the rebound hardness characteristics of a sampled subsurface geology. Other geophysical instruments may also be employed to measure the relative energy absorption characteristics of a rock mass, abrasivity, rock volume, rock quality, and other physical characteristics that together provide information regarding the relative difficulty associated with boring through a given geology. The data acquired by the Schmidt hammer 166 are also preferably stored in the GDAU 160.

Figure 13:
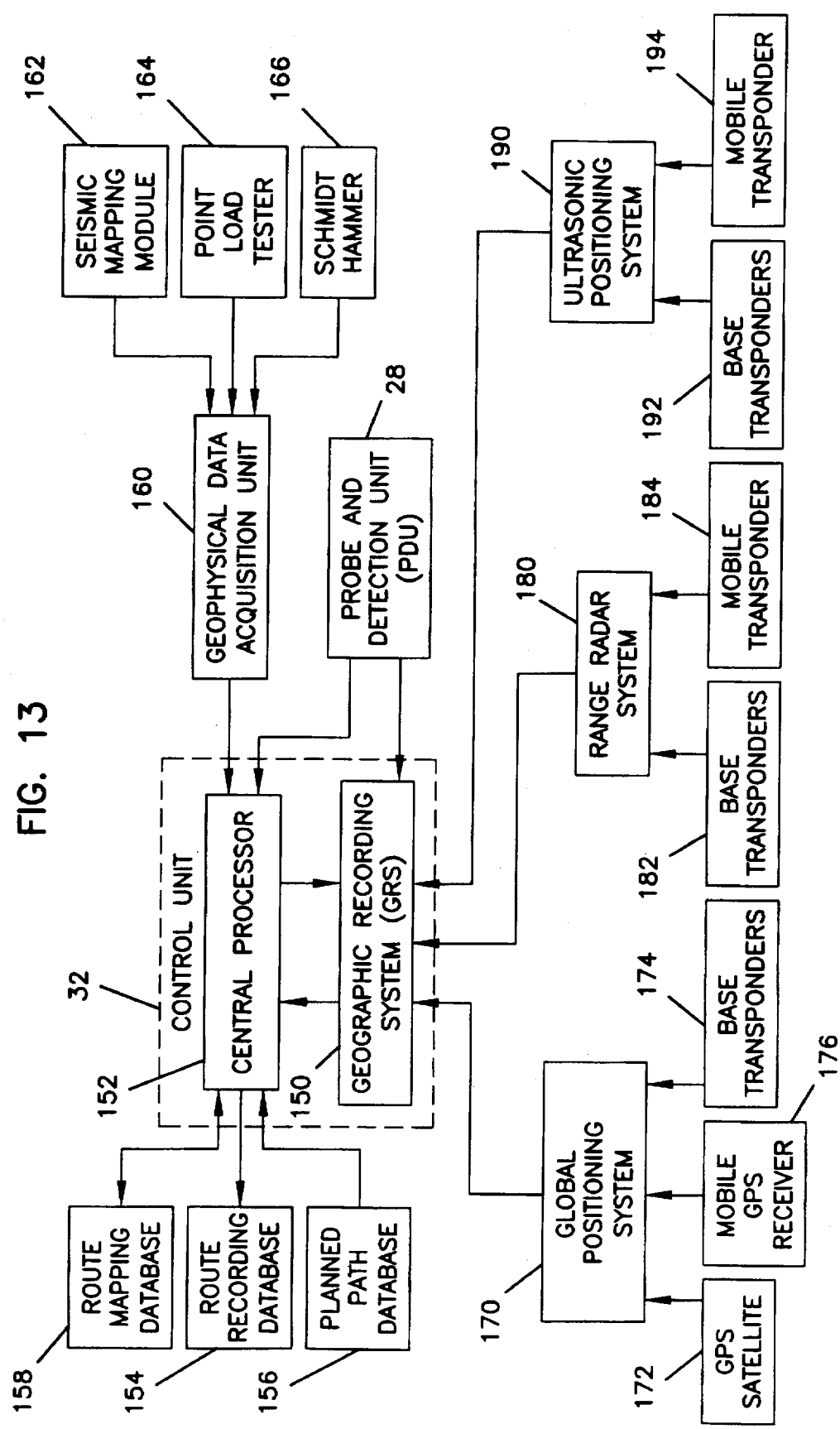
FIG. 13 is a system block diagram of a trenchless boring system control unit incorporating position indicators, a geographical recording system, various databases, and a geological data acquisition unit.

In the embodiment illustrated in FIG. 13, a Global Positioning System (GPS) 170 is employed to provide position data for the GRS 150. In accordance with a U.S. Government project to deploy twenty-four communication satellites in three sets of orbits, termed the Global Positioning System (GPS), various signals transmitted from one or more GPS satellites may be used indirectly for purposes of determining positional displacement of a boring tool 24 relative to one or more known reference locations. It is generally understood that the U.S. Government GPS satellite system provides for a reserved, or protected, band and a civilian band. Generally, the protected band provides for high-precision positioning to a classified accuracy. The protected band, however, is generally reserved exclusively for military and other government purposes, and is modulated in such a manner as to render it virtually useless for civilian applications. The civilian band is modulated so as to significantly reduce the accuracy available, typically to the range of one hundred to three hundred feet.

The civilian GPS band, however, can be used indirectly in relatively high-accuracy applications by using one or more GPS signals in combination with one or more ground-based reference signal sources. By employing various known signal processing techniques, generally referred to as differential global positioning system (DGPS) signal processing techniques, positional accuracies on the order of centimeters are now achievable. As shown in FIG. 13, the GRS 150 uses the signal produced by at least one GPS satellite 172 in cooperation with signals produced by at least two base transponders 174, although the use of one base transponder 174 may be satisfactory in some applications. Various known methods for exploiting DGPS signals using one or more base transponders 174 together with a GPS satellite 172 signal and a mobile GPS receiver 176 coupled to the control unit 32 may be employed to accurately resolve the boring tool 24 movement relative to the base transponder 174 reference locations using a GPS satellite signal source.

In another embodiment, a ground-based positioning system may be employed using a range radar system 180. The range radar system 180 preferably includes a plurality of base radio frequency (RF) transponders 182 and a mobile transponder 184 mounted on the PDU 28. The base transponders 182 emit RF signals which are received by the mobile transponder 184. The mobile transponder 184 preferably includes a computer which calculates the range of the mobile transponder 184 relative to each of the base transponders 182 through various known radar techniques, and then calculates its position relative to all base transponders 182. The position data set gathered by the range radar system 180 is transmitted to the GRS 150 for storing in route recording database 154 or the route mapping system 158.

In yet another embodiment, an ultrasonic positioning system 190 may be employed together with base transponders 192 and a mobile transponder 194 coupled to the PDU 28. The base transponder 192 emits signals having a known clock timebase which are received by the mobile transponder 194. The mobile transponder 194 preferably includes a computer which calculates the range of the mobile transponder 194 relative to each of the base transponders 192 by referencing the clock speed of the source ultrasonic waves. The computer of the mobile transponder 194 also calculates the position of the mobile transponder 194 relative to all of the base transponders 192. It is to be understood that various other known ground-based and satellite-based positioning systems and techniques may be employed to accurately determine the path of the boring tool 24 along an underground path.

Figure 14:
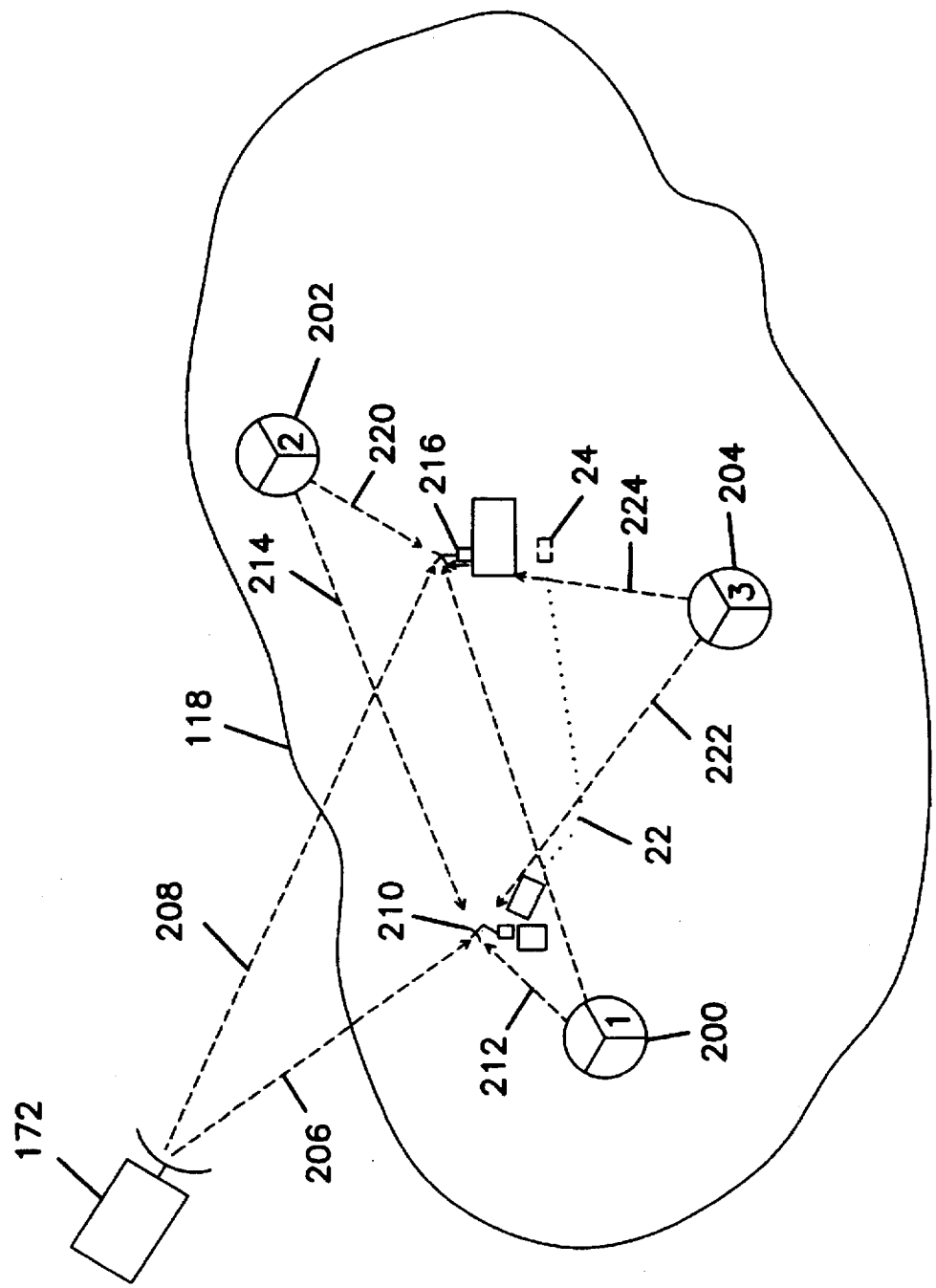
FIG. 14 is an illustration of a boring site and a trenchless boring system incorporating position location devices.

FIG. 14 illustrates an underground boring tool 24 performing a boring operation along an underground path at a boring site. An important advantage of the novel geographic positioning unit 150, generally illustrated in FIG. 14, concerns the ability to accurately navigate the boring tool 24 along a predetermined boring route and to accurately map the underground boring path in a route mapping database 158 coupled to the control unit 32. It may be desirable to perform an initial survey of the proposed boring site prior to commencement of the boring operation for the purpose of accurately determining a boring route which avoids difficulties, such as previously buried utilities or other obstacles, including rocks, as is discussed hereinbelow.

As the boring tool 24 progresses along the predetermined boring route, actual positioning data are collected by the geographic recording system 150 and stored in the route mapping database 158. Any intentional deviation from the predetermined route stored in the planned path database 156 is accurately recorded in the route mapping database 158. Unintentional deviations are preferably corrected so as to maintain the boring tool 24 along the predetermined underground path. Upon completion of a boring operation, the data stored in the route mapping database 158 may be downloaded to a personal computer (not shown) to construct an "as is" underground map of the boring site. Accordingly, an accurate map of utility or other conduits installed along the boring route may be constructed from the route mapping data and subsequently referenced by those desiring to gain access to, or avoid, such buried conduits.

Still referring to FIG. 14, accurate mapping of the boring site may be accomplished using a global positioning system 170, range radar system 180 or ultrasonic positioning system 190 as discussed previously with respect to FIG. 13. A mapping system having a GPS system 170 preferably includes first and second base transponders 200 and 202 together with one or more GPS signals 206 and 208 received from GPS satellites 172. A mobile transponder 210, preferably coupled to the control unit 32, is provided for receiving the GPS satellite signal 206 and base transponder signals 212 and 214 respectively transmitted from the transponders 200 and 202 in order to locate the position of the control unit 32. As previously discussed, a modified form of differential GPS positioning techniques may be employed to enhance positioning accuracy to the centimeter range. A second mobile transponder 216, preferably coupled to the PDU 28, is provided for receiving the GPS satellite signal 208 and base transponder signals 218 and 220 respectively transmitted from the transponders 200 and 202 in order to locate the position of the PDU 28.

In another embodiment, a ground-based range radar system 180 includes three base transponders 200, 202 and 204 and mobile transponders 210 and 216 coupled to the control unit 12 and PDU 28, respectively. It is noted that a third ground-based transponder 204 may be provided as a backup transponder for a system employing GPS satellite signals 206 and 208 in cases where GPS satellite signal 206 and 208 transmission is temporarily terminated, either purposefully or unintentionally. Position data for the control unit 32 are preferably processed and stored by the GRS 150 using the three reference signals 212, 214 and 222 received from the ground-based transponders 200, 202 and 204, respectively.

Position data for the PDU 28, obtained using the three reference signals 218, 220 and 224 received respectively from the ground-based transponders 200, 202 and 204, are preferably processed and stored by the local position locator 216 coupled to the PDU 28 and then sent to the control unit 32 via a data transmission link 34. An embodiment employing an ultrasonic positioning system 190 would similarly employ three base transponders 200, 202 and 204, together with mobile transponders 210 and 216 coupled to the control unit 32 and PDU 28, respectively.

Figure 15:
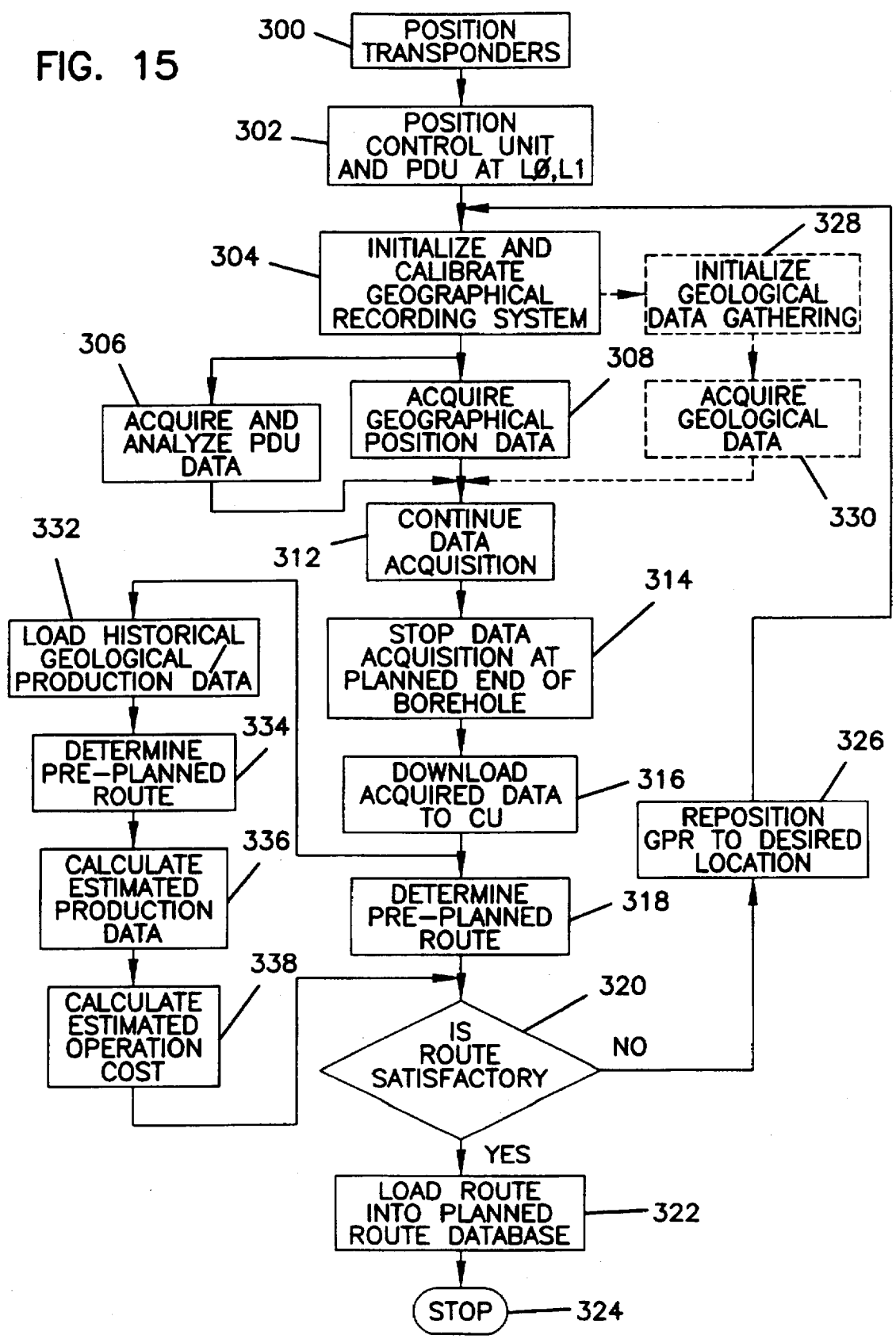
FIG. 15 illustrates in flow diagram form generalized method steps for performing a pre-bore survey.

Referring now to FIG. 15, there is illustrated in flowchart form generalized steps associated with the pre-bore survey process for obtaining a pre-bore site map and determining the optimum route for the boring operation prior to commencing the boring operation. In brief, a pre-bore survey permits examination of the ground through which the boring operation will take place and a determination of an optimum route, an estimate of the productivity, and an estimate of the cost of the entire boring operation.

Initially, as shown in FIG. 15, a number of ground-based transponders are positioned at appropriate locations around the boring site at step 300. The control unit 32 and the PDU 28 are then situated at locations L0 and L1 respectively at step 302. The geographical recording system 150 is then initialized and calibrated at step 304 in order to locate the initial positions of the control unit 32 and PDU 28. After successful initialization and calibration, the PDU 28 is moved along a proposed boring route, during which PDU data and geographical location data are acquired at steps 306 and 308, respectively. The data gathered by the PDU 28 are preferably analyzed at steps 306 and 308. The acquisition of data continues at step 312 until the expected end of the proposed boring route is reached, at which point data accumulation is halted, as indicated at step 314. The acquired data are then downloaded to the control unit 32, which may be a personal computer, at step 316. The control unit 32, at step 318, then calculates an optimum pre-determined path for the boring operation, and does so as to avoid obstacles and other structures. If it is judged that the pre-determined route is satisfactory, as is tested at step 320, the route is then loaded into the planned path database 156 at step 322, and the pre-bore survey process is halted at step 324. If, however, it is determined that the planned route is unsatisfactory, as is tested at step 320 because, for example, the survey revealed that the boring tool 24 would hit a rock obstacle or that there were buried utilities which could be damaged during a subsequent boring operation, then the PDU 28 can be repositioned, at step 326, at the beginning of the survey route and a new route surveyed by repeating steps 304–318. After a satisfactory route has been established, the prebore survey process is halted at step 324.

In another embodiment, the pre-bore survey process includes the collection of geological data along the survey path, concurrently with position location and PDU data collection. This collection activity is illustrated in FIG. 15 which shows an initialization and calibration step 328 for the geophysical data acquisition unit 160 (GDAU) taking place concurrently with the initialization and calibration of the geographical recording system 150. The GDAU 160 gathers geological data at step 330 at the same time as the PDU 28 and position data are being acquired in steps 306 and 308, respectively. The inclusion of geological data gathering provides for a more complete characterization of the ground medium in the proposed boring pathway, thus allowing for more accurate productivity and cost estimates to be made for the boring operation.

In a third embodiment, the survey data are compared with previously acquired data stored in the route mapping database 158 in order to provide estimates of the boring operation productivity and cost. In this embodiment, historical data from the route mapping database are loaded into the control processor 152 at step 332 after the survey data have been downloaded to the control unit 32 in step 316. The data downloaded from the route mapping database 158 include records of prior surveys and boring operations, such as GPR and geological characterization measurements and associated productivity data. The pre-planned route is calculated at step 334 in a manner similar to the calculation of the route indicated at step 318. By correlating the current ground characterization, resulting from the PDU 28 and GDAU 160 data, with prior characterization measurements and making reference to associated prior productivity results, it is possible to estimate, at step 336, productivity data for the planned boring operation. Using the estimated production data of step 336, it is then possible to produce a cost estimate of the boring process at step 338. In the following step 320, a determination is made regarding whether or not the pre-planned route is satisfactory. This determination can be made using not only the subsurface features as in the first embodiment, but can be made using other criteria, such as the estimated duration of the boring process or the estimated cost.

Figure 16:
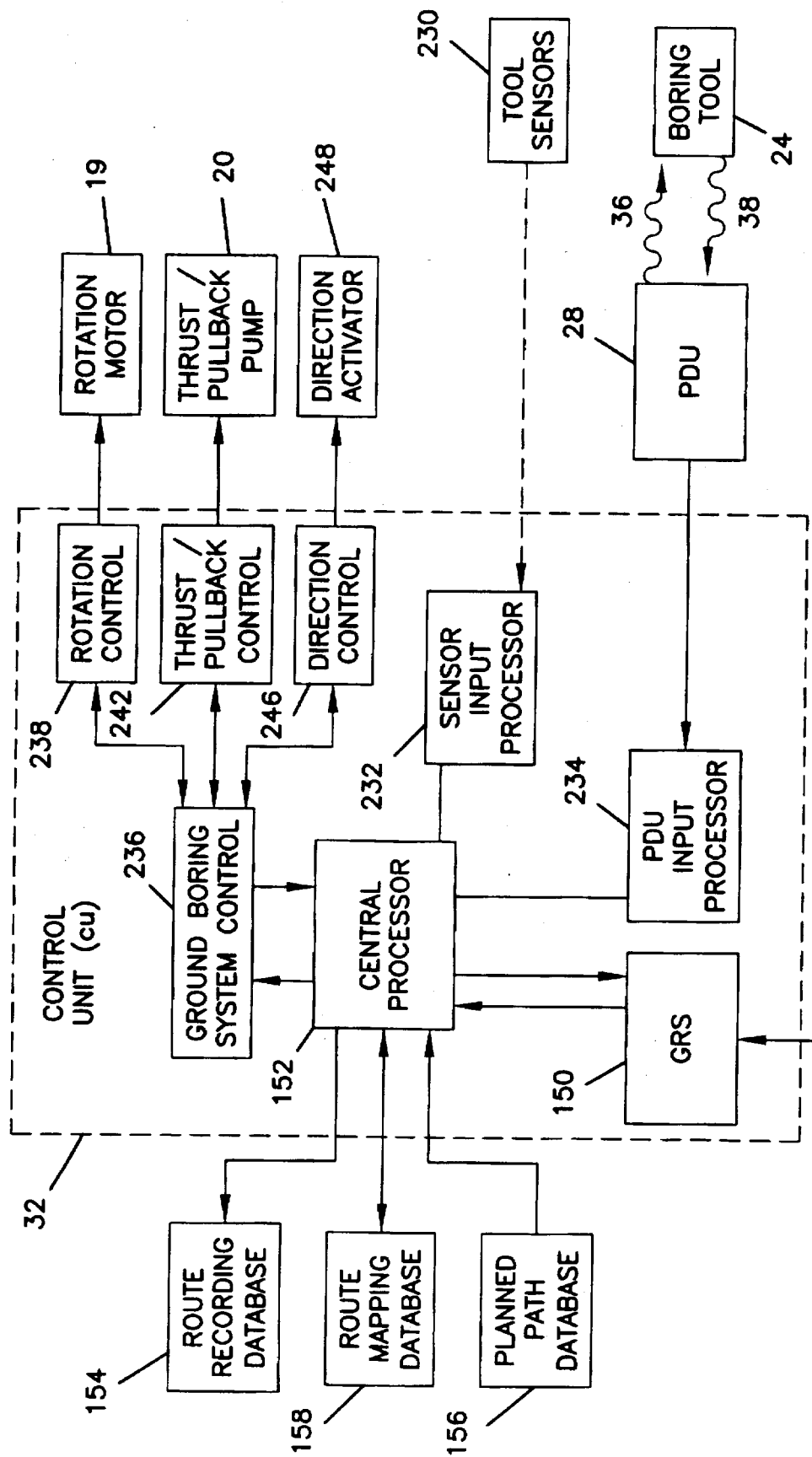
FIG. 16 is a system block diagram of a trenchless underground boring system control unit for controlling the boring operation.

Referring now to FIG. 16, there is illustrated a system block diagram of a control unit 32, its various components, and the functional relationship between the control unit 32 and various other elements of the trenchless underground boring system 12. The control unit 32 includes a central processor 152 which accepts input data from the geographic recording system 150, the PDU 28, and the GDAU 160. The central processor 152 calculates the position of the boring tool 24 from the input data. The control processor 152 records the path taken by the boring tool 24 in the route recording database 154 and/or adds it to the existing data in the route mapping database 158.

In an alternative embodiment, the central processor 152 also receives input data from the sensors 230 located at the boring tool 24 through the sensor input processor 232. In another embodiment, the central processor 152 loads data corresponding to a predetermined path from the planned path database 156 and compares the measured boring tool position with the planned position. The position of the boring tool 24 is calculated by the central processor 152 from data supplied by the PDU input processor 234 which accepts the data received from the PDU 28. In an alternative embodiment, the central processor 152 also employs data on the position of the PDU 28, supplied by the Geographic Recording System 150, in order to produce a more accurate estimate of the boring tool location.

Corrections in the path of the boring tool 24 during a boring operation can be calculated and implemented to return the boring tool 24 to a predetermined position or path. The central processor 152 controls various aspects of the boring tool operation by use of a trenchless ground boring system control (GBSC) 236. The GBSC 236 sends control signals to boring control units which control the movement of the boring tool 24. These boring control units include the rotation control 238, which controls the rotating motor 19 for rotating the drill string 22, the thrust/pullback control 242, which controls the thrust/pullback pump 20 used to drive the drill string 22 longitudinally into the borehole, and the direction control 246, which controls the direction activator mechanism 248 which steers the boring tool 24 in a desired direction. The PDU input processor 234 may also identify buried features, such as utilities, from data produced by the PDU 28. The central processor 152 calculates a path for the boring tool 24 which avoids any possibility of a collision with, and subsequent damage to, such buried features.

Figure 17:
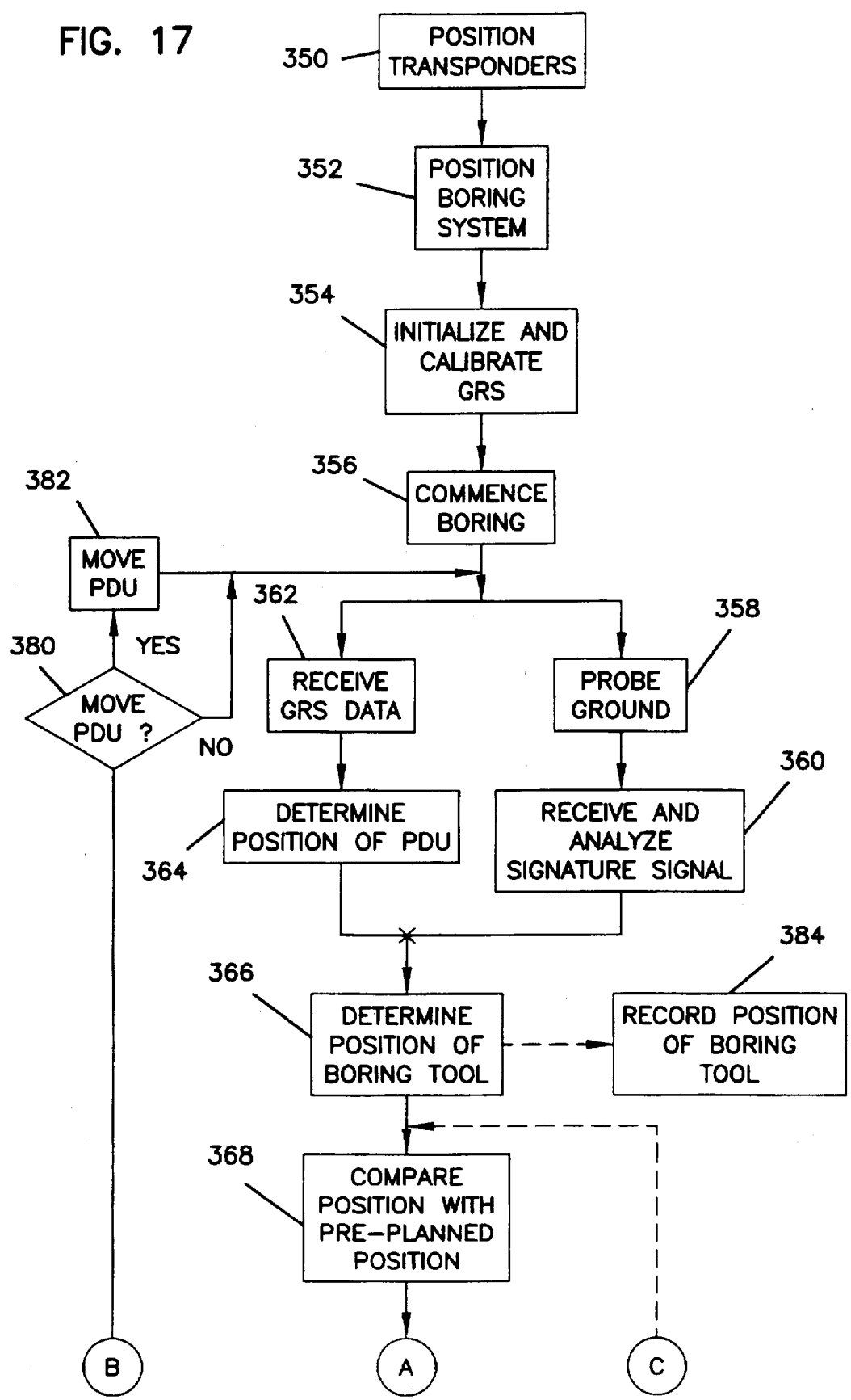
FIGS. 17–18 illustrate in flow diagram form generalized method steps for performing a trenchless boring operation.
Figure 18:
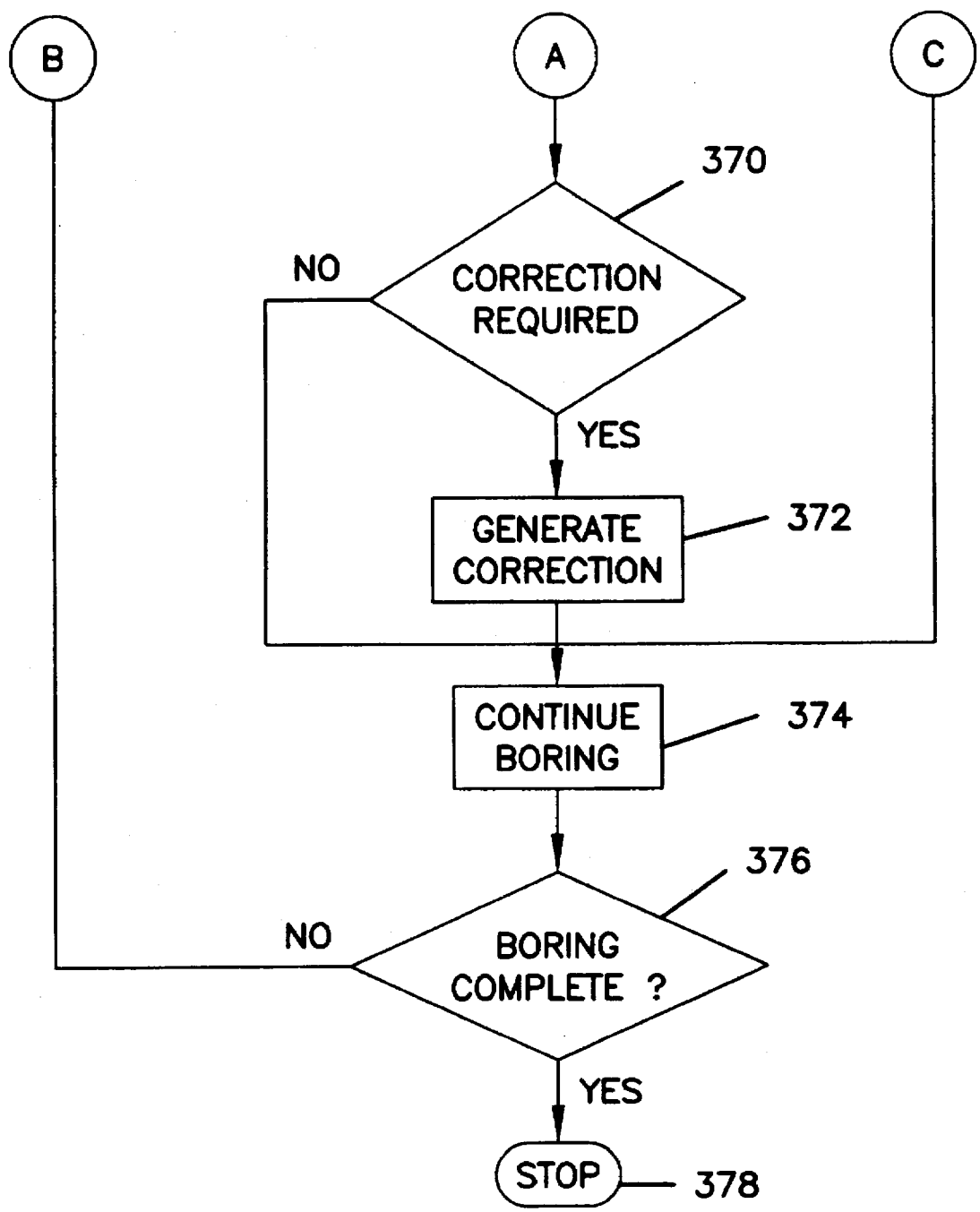

In FIGS. 17 and 18, there are illustrated flow charts for generalized process and decision steps associated with boring a trenchless hole through the ground. Initially, as shown in FIG. 15 and at step 350, a number of ground-based transponders are positioned at appropriate locations around a boring site. The trenchless underground boring system 12 is then positioned at the appropriate initial location, as indicated at step 352, and the transponders and geographic recording system are initialized and calibrated, at step 354, prior to the commencement of boring, at step 356. After boring has started, the PDU 28 probes the ground at step 358 and then receives and analyzes the signature signal at step 360. Independent of, and occurring concurrently with, the probing and receiving steps 358 and 360, the GRS receives position data at step 362 and determines the position of the PDU 28 at step 364. After steps 362 and 364 have been completed, the central processor 152 then determines the position of the boring tool 24 at step 366. The central processor 152 then compares the measured position of the boring tool 24 with the expected position, at step 368, as given in the planned path database 156 and calculates whether or not a correction is required to the boring tool direction, at step 370, and provides a correction at step 372, if necessary. The trenchless underground boring system 12 continues to bore through the ground at step 374 until the boring operation is completed as indicated at steps 376 and 378. If, however, the boring operation is not complete, the central processor 152 decides, at step 380, whether or not the PDU 28 should be moved in order to improve the image of the boring tool 24. The PDU 28 is then moved if necessary at step 382 and the probing and GRS data reception steps 358 and 362 recommence. The operation is halted after the boring tool 24 has reached a final destination.

In an alternative embodiment, shown in dashed lines in FIGS. 17 and 18, the central processor 152 records, at step 384, the calculated position of the boring tool 24 in the route mapping database 158 and/or the route recording database 154, after determining the position of the boring tool at step 366. In another embodiment, the steps of comparing (step 368) the position of the boring tool 24 with a pre-planned position and generating any necessary corrections (steps 370 and 372) are omitted as is illustrated by the dashed line 386.

Figure 19A:
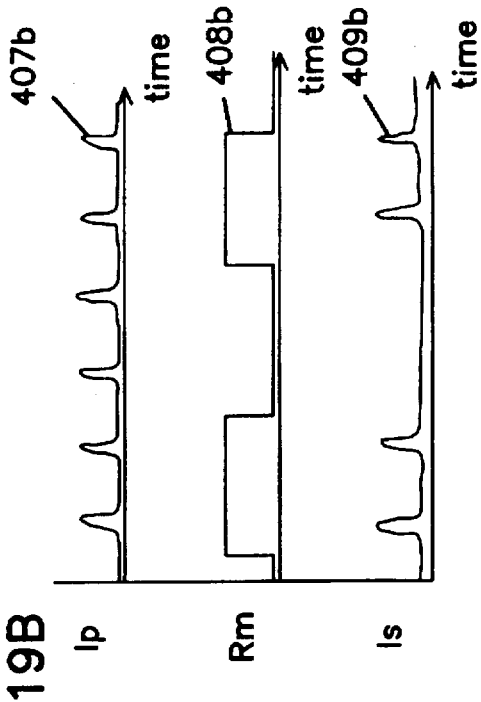
FIG. 19 illustrates an embodiment of a trenchless underground boring tool incorporating various sensors, and further depicts sensor signal information.
Figure 19B:
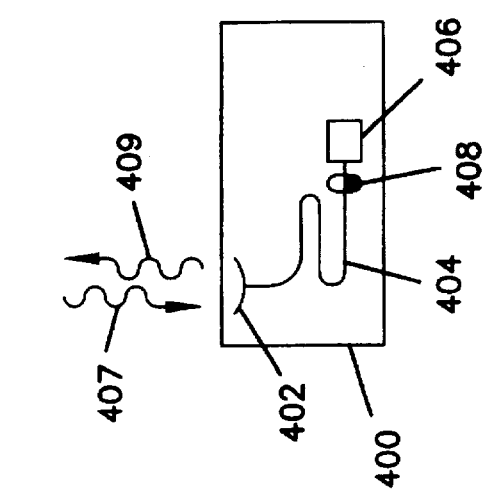

Additional features can be included on the boring tool 24. It may be desired, under certain circumstances, to make certain measurements of the boring tool 24 orientation, shear stresses on the drill string 22, and the temperature of the boring tool 24, for example, in order to more clearly understand the conditions of the boring operation. Additionally, measurement of the water pressure at the boring tool 24 may provide an indirect measurement of the depth of the boring tool 24 as previously described hereinabove. FIG. 19 illustrates two embodiments of additional boring tool head features. In FIG. 19a, there is shown an embodiment which allows the operator to determine the orientation of the boring tool 24. It may be desirable for the operator to know the orientation of the boring tool 24 when adjusting the direction of the boring tool 24 along an underground pathway, since several techniques known in the art for directing boring tools rely on a preferential orientation of the tool. If the boring tool 24 orientation is not known, the boring tool 24 cannot be steered in a preferred direction in accordance with such known techniques that require knowledge of boring tool 24 orientation. It may not be possible to determine the orientation of the boring tool 24 simply from a knowledge of the orientation of the members 23 of the drill string 22, since one or more members 23 of the drill string 22 may twist or slip relative to one another during the boring operation. Since the boring operation takes place underground, the operator has no way of detecting whether such twisting or slipping has occurred. It may, therefore, be important to determine the orientation of the boring tool 24.

FIG. 19a illustrates an embodiment of a boring tool 400 which has a passive time domain signature signal circuit including a single antenna 402, connected via a time delay line 404 to a termination 406, as discussed hereinabove with respect to FIG. 5a. The circuit illustrated in FIG. 19a also includes a mercury switch 408 located at a point along the delay line 404 close to the termination 406. The termination 406 also includes a dissipative load. When the boring tool 400 is oriented so that the mercury switch 408 is open, the time domain signature signal is generated by reflecting an incoming probe signal 407 at the open circuit of the mercury switch 408. When the boring tool 400 is oriented so that the mercury switch 408 is closed, the circuit from the antenna 402 is completed to the dissipative load 406 through the delay line 404. The probe signal 407 does not reflect from the dissipative load 406 and therefore no signature signal is generated. The generation of the signature signal 409 received by the PDU 28 is shown as a function of time in FIG. 19b. The top trace 407b shows the probe signal 407, $I_p$, plotted as a function of time. As the boring tool 400 rotates and moves along an underground path, the resistance, Rm, of the mercury switch 408 alternates from low to high values, as shown in the center trace 408b. The regular opening and closing of the mercury switch 408 modulates the signature signal 409b, $I_s$, received at the surface. The modulation maintains a constant phase relative to a preferred orientation of the boring tool 24. The lower trace does not illustrate the delaying effects of the time delay line 404 since the time scales are so different (the time delay on the signature signal 409 is of the order of 10 nanoseconds, while the time taken for a single rotation of the boring tool 24 is typically between 0.1 and 1 second). Detection of the modulated signature signal 409 by the PDU 28 allows the operator to determine the orientation of the boring tool head. It is understood that the other embodiments of signature signal generation described hereinabove can also incorporate a mercury switch 408 and, preferably, a dissipative load 406 in order to generate a modulated signature signal 409 for purposes of detecting the orientation of the boring tool 24.

Figure 19C:
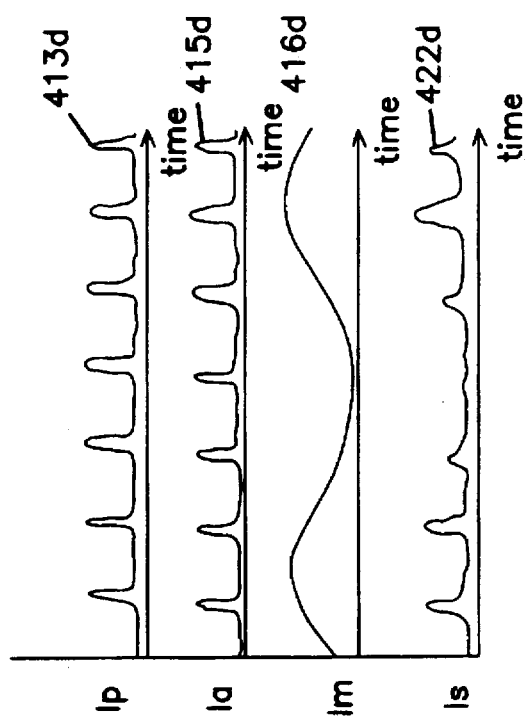
Figure 19D:
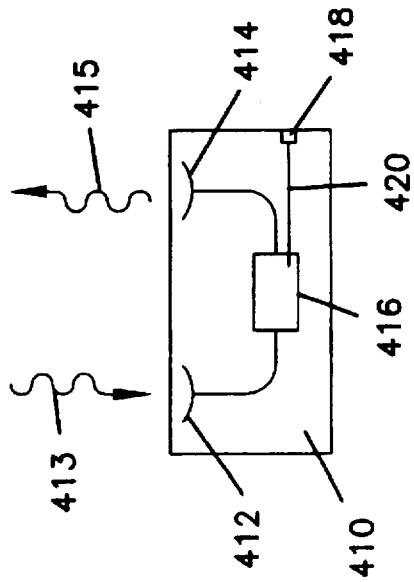

FIG. 19c illustrates an embodiment which allows sensors to sense the environment of the boring tool 410. The figure shows an active time domain signature signal generation circuit which includes a receive antenna 412 connected to a transmit antenna 414 through an active time domain circuit 416. A sensor 418 is connected to the active time domain circuit 416 via a sensor lead 420. In this embodiment, the sensor 418 is placed at the tip of the boring tool 410 for measuring the pressure of water at the boring tool 410. The reading from the sensor 418 is detected by the active time domain circuit 416 which converts the reading into a modulation signal. The modulation signal is subsequently used to modulate the actively generated signature signal 415. This process is described with reference to FIG. 19d, which shows several signals as a function of time. The top signal 413d represents the probe signal, $I_p$, received by the receive antenna 412. The second signal, 415d, represents the actively generated signature signal $I_a$, which would be generated if there were no modulation of the signature signal. The third trace, 416d, shows the amplitude modulation signal, $I_m$, generated by the active time domain circuit 416, and the last trace, 422d, shows the signature signal, $I_s$, after amplitude modulation. The modulated signature signal 415 is detected by the PDU 28. Subsequent determination of the modulation signal by the signal processor 60 in the PDU 28 provides data regarding the output from the sensor 418.

Modulation of the signature signal is not restricted to the combination of amplitude modulation of a time domain signal as shown in the embodiment of FIG. 19. This combination was supplied for illustrative purposes only. It is understood that other embodiments include amplitude modulation of frequency domain signature signals, and frequency modulation of both time and frequency domain signature signals. In addition, the boring tool 24 may include two or more sensors rather than the single sensor as illustrated in the above embodiment.

FIG. 20a illustrates another embodiment of the invention in which a separate active beacon is employed for transmitting information on the orientation or the environment of the boring tool 430 to the PDU 28. In this embodiment, shown in FIG. 20a, the boring tool 430 includes a passive time domain signature circuit employing a single antenna 432, a time delay line 434, and an open termination 436 for reflecting the electrical signal. The single antenna 432 is used to receive a probe signal 433 and transmit a signature/beacon signal 435. An active beacon circuit 438 generates a beacon signal, preferably having a selected frequency in the range of 50 KHz to 500 MHz, which is mixed with the signature signal generated by the termination 436 and transmitted from the antenna 432 as the composite signature/beacon signal 435. A mercury switch 440 is positioned between the active beacon circuit 438 and the antenna 432 so that the mercury switch 440 operates only on the signal from the active beacon circuit 438 and not on the signature signal generated by the termination 436. When the boring tool 430 is oriented so that the mercury switch 440 is open, the beacon signal circuit 438 is disconnected from the antenna 432, and no signal is transmitted from the active beacon circuit 438. When the boring tool 430 is oriented so that the mercury switch 440 is closed, the active beacon circuit 438 is connected to the antenna 432 and the signal from the active beacon circuit 438 is transmitted along with the signature signal as the signature/beacon signal 435. The effect of the mercury switch on the signature/beacon signal 435 has been described previously with respect to FIG. 19b. The top trace 438b shows the signal, $I_b$, generated by the active beacon circuit 438 as a function of time. As the boring tool 430 rotates and moves along an underground path, the resistance, Rm, of the mercury switch 440 alternates from low to high values, as shown in the center trace 440b. The continual opening and closing of the mercury switch 440 produces a modulated signature/beacon signal 435b, $I_m$, which is received at the surface by the PDU 28. Only a beacon signal component, and no signature signal component, is shown in signal $I_m$ 435b. The modulation of signal $I_m$ 435b maintains a constant phase relative to a preferred orientation of the boring tool 430. Analysis of the modulation of the beacon signal by a beacon receiver/analyzer 61 on the PDU 28 allows the operator to determine the orientation of the boring tool head.

FIG. 20c illustrates an embodiment which allows sensors to sense the environment of the boring tool 450 where an active beacon is used to transmit sensor data. The figure shows an active time domain signature signal generation circuit including a receive antenna 452, a transmit antenna 454, and an active time domain signature signal circuit 456, all of which are connected via a time delay line 457. An active beacon circuit 460 is also connected to the transmit antenna 454. A sensor 458 is connected to the active beacon circuit 460 via a sensor lead 462. In this embodiment, the sensor 458 is placed near the tip of the boring tool 450 and is used to measure the pressure of water at the boring tool 450. The sensor reading is detected by the active beacon circuit 460 which converts the signal from the sensor 458 into a modulation signal. The modulation signal is subsequently used to modulate an active beacon signal generated by the active beacon circuit 460. To illustrate the generation of the signature/beacon signal 455 transmitted to the PDU 28, several signals are illustrated as a function of time in FIG. 20d. The signal 453d represents the probe signal, $I_p$, received by the receive antenna 452. The second signal 456d represents the time-delayed signature signal, $I_s$, generated by the active time domain circuit 456. The third signal 460d, $I_c$, represents a combination of the time-delayed signature signal $I_s$ 456d and an unmodulated signal produced by the active beacon circuit 460. The last trace, 455d, shows a signal received at the surface, $I_m$, which is a combination of the time-delayed signature signal $I_s$ 456d and a signal produced by the active beacon circuit 460 which has been modulated in accordance with the reading from the sensor 458. Detection of the modulated active beacon signal by the beacon signal detector 61 in the PDU 28, followed by appropriate analysis, provides data to the user regarding the output from the sensor 458.

It will, of course, be understood that various modifications and additions can be made to the preferred embodiments discussed hereinabove without departing from the scope or spirit of the present invention. Accordingly, the scope of the present invention should not be limited by the particular embodiments described above, but should be defined only by the claims set forth below and equivalents thereof.

What is claimed is:

1. A system for detecting a location of an underground boring tool, comprising:
   generation means, separate from the boring tool, for generating a probe signal;
   producing means for producing a signature signal at the boring tool in response to the probe signal; and
   detection means for detecting the location of the boring tool using the signature signal.

2. The system of claim 1, wherein the probe signal comprises an electromagnetic signal.

3. The system of claim 1, wherein the probe signal comprises an acoustic signal.

4. The system of claim 1, wherein the generation means comprises a ground penetrating radar.

5. The system of claim 4, wherein the ground penetrating radar system produces a three-dimensional image of a subsurface.

6. The system of claim 1, wherein the signature signal is passively produced by the producing means.

7. The system of claim 1, wherein the signature signal is actively produced by the producing means.

8. The system of claim 1, wherein a polarization of the signature signal is orthogonal to a polarization of the probe signal.

9. The system of claim 1, wherein the signature signal has a characteristic in either the time domain or the frequency domain.

10. The system of claim 1, comprising location determining means for determining a geographical location of the boring tool.

11. The system of claim 1, comprising determining means for determining a predetermined route for the boring tool to follow.

12. The system of claim 1, comprising recording means for recording an underground path produced by the boring tool.

13. The system of claim 1, comprising:
   characterization means for characterizing a ground medium through which the boring tool bores; and
   storing means for storing the characterization of the ground medium.

14. An underground boring system comprising:
   a boring tool;
   a driving system for driving the boring tool so as to produce an underground path;
   a probe signal generator, separate from the boring tool, for generating a probing signal;
   a signature signal generator for producing a signature signal at the boring tool in response to the probing signal; and
   a location detector for detecting a location of the boring tool along the underground path using the signature signal.

15. The system of claim 14, wherein the boring tool comprises a direction control apparatus coupled to the driving system for controlling a boring direction of the boring tool.

16. The system of claim 14, comprising a location determining apparatus for determining a geographical location of the boring tool.

17. The system of claim 14, comprising:
   a ground characterization system for characterizing a ground composition of the underground path; and
   a computer, coupled to the ground characterization system, for determining the underground path so as to avoid an obstruction to the boring tool.

18. The system of claim 14, comprising:
   a computer for comparing the underground path produced by the boring tool to a predetermined underground route and for producing a comparison signal indicative of a difference between the underground path and the predetermined underground route;
   wherein the computer effects a modification to a boring direction of the boring tool in response to the comparison signal.

19. The system of claim 14, comprising:
   a ground penetrating radar for producing ground characterization data associated with a predetermined underground boring route; and
   a computer for associating the ground characterization data with existing boring operation data to produce estimated boring operation productivity information.

20. The system of claim 19, wherein the computer controls the driving system using the estimated boring operation productivity information.

21. The system of claim 14, wherein the probe signal generator includes a ground penetrating radar system, the ground penetrating radar system further producing ground characterization data associated with the underground path, the system further comprising:
   a computer, coupled to the ground penetrating radar system, for storing in a database the ground characterization data.

22. The system of claim 14, wherein the boring tool comprises a sensor.

23. The system of claim 22, wherein the boring tool further comprises means for transmitting data produced by the sensor.

24. A method for detecting a location of an underground boring tool, comprising the steps of:

generating a probe signal from a signal source separate from the boring tool;

producing a signature signal at the boring tool in response to the probe signal; and detecting the location of the boring tool using the signature signal.

25. The method of claim 24, wherein generating the probe signal includes generating an electromagnetic probe signal.

26. The method of claim 24, wherein generating the probe signal includes generating an acoustic probe signal.

27. The method of claim 24, wherein generating the probe signal includes generating the probe signal using a ground penetrating radar.

28. The method of claim 24, wherein generating the signature signal includes passively producing the signature signal.

29. The method of claim 24, wherein generating the signature signal includes actively producing the signature signal having a characteristic in the time domain or the frequency domain.

30. The method of claim 24, wherein generating the signature signal includes producing the signature signal having a polarization orthogonal to a polarization of the probe signal.

31. The method of claim 24, wherein detecting the boring tool location includes detecting the location of the boring tool in three dimensions using a ground penetrating radar.

32. The method of claim 24, further comprising modifying a rate of boring tool productivity based on the location of the boring tool.

33. A system for detecting a location of an underground excavation implement, comprising:

a first signal generator that generates a probe signal;

a second signal generator that produces a signature signal at the excavation implement in response to the probe signal; and a detector that detects the location of the excavation implement using the signature signal.

34. The system of claim 33, wherein the probe signal comprises an electromagnetic signal.

35. The system of claim 33, wherein the probe signal comprises an acoustic signal.

36. The system of claim 33, wherein the first signal generator comprises a ground penetrating radar.

37. The system of claim 36, wherein the ground penetrating radar produces a three-dimensional image of a subsurface.

38. The system of claim 33, wherein the signature signal is passively or actively produced by the producing means.

39. The system of claim 33, wherein a polarization of the signature signal is orthogonal to a polarization of the probe signal.

40. The system of claim 33, wherein the signature signal has a characteristic in either the time domain or the frequency domain.

41. The system of claim 33, comprising a location system that determines a geographical location of the excavation implement.

42. The system of claim 33, comprising a navigation system that directs the excavation implement along a predetermined route.

43. The system of claim 33, comprising a database that stores data on an underground path produced by the excavation implement.

44. The system of claim 33, comprising a ground characterization system that characterizes a ground medium through which the excavation implement bores.

* * * * *

UNITED STATES PATENT AND TRADEMARK OFFICE
CERTIFICATE OF CORRECTION

PATENT NO. : 5,720,354
DATED : FEBRUARY 24, 1998
INVENTOR(S) : STUMP ET AL.

It is certified that error appears in the above-identified patent and that said Letters Patent is hereby corrected as shown below:

On the title page, item [75]

Inventors: "Md." should read —Mo.—

Signed and Sealed this

Fifteenth Day of September, 1998

Attest:

BRUCE LEHMAN

Attesting Officer

Commissioner of Patents and Trademarks